United States Patent
Han et al.

(10) Patent No.: US 10,353,659 B2
(45) Date of Patent: Jul. 16, 2019

(54) ELECTRONIC DEVICE FOR CONTROLLING PLURALITY OF DISPLAYS AND CONTROL METHOD

(71) Applicant: Samsung Electronics Co., Ltd., Suwon-si, Gyeonggi-do (KR)

(72) Inventors: Jong-Hyun Han, Seoul (KR); Bo-Keun Kim, Suwon-si (KR); Mi-Jung Park, Hwaseong-si (KR); Sung-Sik Lee, Seoul (KR); Kyu-Ok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/545,566

(22) PCT Filed: Jan. 21, 2016

(86) PCT No.: PCT/KR2016/000671
§ 371 (c)(1),
(2) Date: Jul. 21, 2017

(87) PCT Pub. No.: WO2016/117947
PCT Pub. Date: Jul. 28, 2016

(65) Prior Publication Data
US 2018/0011676 A1    Jan. 11, 2018

(30) Foreign Application Priority Data
Jan. 23, 2015  (KR) .......................... 10-2015-0011272

(51) Int. Cl.
*G06F 3/14* (2006.01)
*G06F 1/16* (2006.01)
(Continued)

(52) U.S. Cl.
CPC .......... *G06F 3/1431* (2013.01); *G06F 1/1618* (2013.01); *G06F 1/1632* (2013.01);
(Continued)

(58) Field of Classification Search
CPC .... G06F 1/1618; G06F 1/1632; G06F 1/1647; G06F 1/1649; G06F 1/1654;
(Continued)

(56) References Cited

U.S. PATENT DOCUMENTS 7,032,086 B2   4/2006  Merchant
7,460,108 B2  12/2008  Tamura
(Continued)

FOREIGN PATENT DOCUMENTS

EP   1 058 181 A1  12/2000
EP     2254314 A1  11/2010
(Continued)

*Primary Examiner* — Stephen G Sherman
(74) *Attorney, Agent, or Firm* — Jefferson IP Law, LLP

(57) ABSTRACT

According to various examples of the present invention, an electronic device for controlling a plurality of displays can comprise: a first display for displaying a first screen; a second display for displaying a second screen; and a control unit for determining attributes of the first screen and the second screen, for determining whether to display, on a display that does not enter into an idle mode, a screen displayed on a display that enters into the idle mode in correspondence to the entry into the idle mode of either the first display or the second display, and for controlling the first display or the second display such that the first screen or the second screen is displayed thereon. In addition, various other examples are possible.

16 Claims, 20 Drawing Sheets

(51) Int. Cl.
*G06F 1/3218* (2019.01)
*G06F 3/01* (2006.01)
*G06F 3/147* (2006.01)
*G06F 1/3234* (2019.01)
*G06F 3/0481* (2013.01)
*G09G 5/14* (2006.01)

(52) U.S. Cl.
CPC .......... *G06F 1/1647* (2013.01); *G06F 1/1649* (2013.01); *G06F 1/1654* (2013.01); *G06F 1/1677* (2013.01); *G06F 1/3218* (2013.01); *G06F 1/3265* (2013.01); *G06F 3/013* (2013.01); *G06F 3/0481* (2013.01); *G06F 3/147* (2013.01); *G06F 3/1423* (2013.01); *G06F 3/1446* (2013.01); *G06F 1/1626* (2013.01); *G06F 1/1686* (2013.01); *G06F 1/1694* (2013.01); *G06F 3/14* (2013.01); *G06F 2200/1634* (2013.01); *G09G 5/14* (2013.01); *G09G 2340/04* (2013.01); *Y02D 10/153* (2018.01); *Y02D 50/20* (2018.01)

(58) Field of Classification Search
CPC .... G06F 1/1677; G06F 1/3218; G06F 1/3265; G06F 1/1626; G06F 1/1686; G06F 1/1694; G06F 3/1431; G06F 3/013; G06F 3/0481; G06F 3/1423; G06F 3/1446; G06F 3/147; G06F 3/14; G06F 2200/1634; G09G 5/14; G09G 2340/04
See application file for complete search history.

(56) References Cited

U.S. PATENT DOCUMENTS

| | | |
|---|---|---|
| 8,648,880 B2 | 2/2014 | Namba |
| 2007/0004475 A1* | 1/2007 | Kuo .................... H04M 1/0214 455/575.3 |
| 2009/0254861 A1 | 10/2009 | Seetharamakrishnan et al. |
| 2010/0302179 A1 | 12/2010 | Ahn et al. |
| 2011/0098019 A1* | 4/2011 | Fujii .................... H04M 1/576 455/411 |
| 2011/0187662 A1 | 8/2011 | Lee et al. |
| 2011/0239142 A1 | 9/2011 | Steeves et al. |
| 2012/0129581 A1 | 5/2012 | Choi et al. |
| 2012/0174028 A1 | 7/2012 | Sirpal et al. |
| 2012/0225694 A1 | 9/2012 | Sirpal et al. |
| 2013/0012273 A1 | 1/2013 | Sato |
| 2013/0181885 A1 | 7/2013 | Tamura |
| 2014/0152606 A1 | 6/2014 | Kunitake et al. |
| 2014/0184526 A1 | 7/2014 | Cho |
| 2014/0189566 A1 | 7/2014 | Kim |
| 2014/0285498 A1 | 9/2014 | Kim et al. |
| 2014/0375219 A1 | 12/2014 | Lee et al. |

FOREIGN PATENT DOCUMENTS

| | | |
|---|---|---|
| EP | 2 618 326 A1 | 7/2013 |
| KR | 10-2014-0087473 A | 7/2014 |
| WO | 2011-005691 A1 | 1/2011 |

* cited by examiner

Incoming call

New Message

Battery low Alert

Planner Alert

Alarm Alert

Timer Alert

ELECTRONIC DEVICE FOR CONTROLLING PLURALITY OF DISPLAYS AND CONTROL METHOD

CROSS-REFERENCE TO RELATED APPLICATION(S)

This application is a U.S. National Stage application under 35 U.S.C. § 371 of an International application filed on Jan. 21, 2016 and assigned application number PCT/KR2016/000671, which claimed the benefit of a Korean patent application filed on Jan. 23, 2015 in the Korean Intellectual Property Office and assigned Serial number 10-2015-0011272, the entire disclosure of which is hereby incorporated by reference.

TECHNICAL FIELD

The present disclosure relates to an electronic device and method for controlling a plurality of displays.

BACKGROUND

Generally, a desktop computer may include at least one display (e.g., a monitor). A mobile device (e.g., a portable phone, a smartphone, or a tablet personal computer (PC)) using a touch screen may include one display.

A user of the desktop computer may divide a screen of the display depending on a work environment (e.g., horizontally or vertically divide the screen to work with a plurality of displayed windows). When a web browser is executed, the user moves up or down a web page by using a page-up button or a page-down button on a keyboard. When using a mouse in place of a keyboard, the user may move up or down the web page by selecting a scroll bar at a side of the web page with a cursor of the mouse. The user may also move to the top of the web page by selecting a top button indicated by a text or an icon on the bottom of the web page.

A mobile device has a small screen size and has a limitation in input when compared to the desktop computer. In case of the mobile device, it is difficult to divide the screen for use.

Moreover, on the mobile device, various applications such as default applications manufactured by a manufacturer of the device and installed on the device and additional applications downloaded and installed through an application store site of the Internet may be executed. The additional applications may be developed by general users and registered on the store site. Thus, any people can freely sell applications developed by them to the user of the mobile device through the application store site. At present, on the mobile device, depending on a product, several tens of thousands of to several hundreds of thousands of applications are provided for free or with fee.

As such, various applications that spark consumers' curiosities and satisfy consumers' demands have been provided on the mobile device, but the mobile devices have limitations in a size of a display and a user interface (UI) because of being manufactured to be of a portable size. Thus, the user may experience inconvenience in executing multiple applications on the mobile device. For example, on the mobile device, if one application is executed, the application may be displayed on the entire display region of the display, and if the user desires to execute another application in this state, the user has to terminate the currently executed application first and then selects an execution key for executing the desired application.

That is, to execute several applications on the mobile device, the user has to perform a cumbersome process of repeating execution and termination of the applications. In addition, there is no way to simultaneously execute multiple applications on the mobile device.

Meanwhile, a conventional method has been proposed in which one or more displays are provided on the mobile device or one display is divided for use. However, even in the mobile device to which the conventional method of adding or dividing the display is applied, when a notification event of additional information occurs or an application is additionally executed, the notification event or a processing view of the application is displayed only in a predefined position, causing interference with an existing main view. Moreover, when the display added or divided is reduced in size, information in the size-reduced display is lost.

SUMMARY

The present disclosure has been made to solve the above-described problems of the conventional art, and provides an electronic device and a control method, by which to address the inconvenience of disturbing a screen currently used by a user or losing information when additional information is generated through an electronic device that controls a plurality of displays, a screen displayed on the plurality of displays may be reconfigured based on a state change of the plurality of displays or attributes of the additional information.

Accordingly, the present disclosure provides an electronic device and method for controlling a plurality of displays.

Various embodiments of the present disclosure to achieve the above and other objects provide an electronic device for controlling a plurality of displays, the electronic device including a first display configured to display a first screen, a second display configured to display a second screen, and a controller configured to determine attributes of the first screen and the second screen, to determine whether to display, on a display that does not enter an idle mode, a screen displayed on the other display that enters the idle mode in correspondence to entry of one of the first display and the second display to the idle mode, and to control the first screen or the second screen to be displayed on the first display or the second display.

Moreover, various embodiments of the present disclosure to achieve the above and other objects provide a method of an electronic device to control a plurality of displays, the method including displaying a first screen on a first display, displaying a second screen on a second display, determining attributes of the first screen and the second screen, controlling entry of one of the first display and the second display to an idle mode, determining whether to display a screen displayed on a display that enters the idle mode on a display that does not enter the idle mode, and displaying the first screen or the second screen on the first display or the second display according to a result of the determination.

Furthermore, various embodiments of the present disclosure to achieve the above and other objects provide a computer-readable recording medium having stored therein a program including an instruction for controlling a plurality of displays of an electronic device, in which the instructions include a first instruction set for displaying a first screen on a first display, a second instruction set for displaying a second screen on a second display, a third instruction set for determining attributes of the first screen and the second screen, a fourth instruction set for controlling entry of one of the first display and the second display to an idle mode, a fifth instruction set for determining whether to display a screen displayed on a display that enters the idle mode on a display that does not enter the idle mode, and a sixth instruction set for displaying the first screen or the second screen on the first display or the second display according to a result of the determination.

According to various embodiments of the present disclosure, by providing an electronic device and a method for controlling a plurality of displays, a state change of the plurality of displays or attributes of added information are determined and a screen configuration may be rearranged suitably for user's intention.

DETAILED DESCRIPTION

Figure 1:
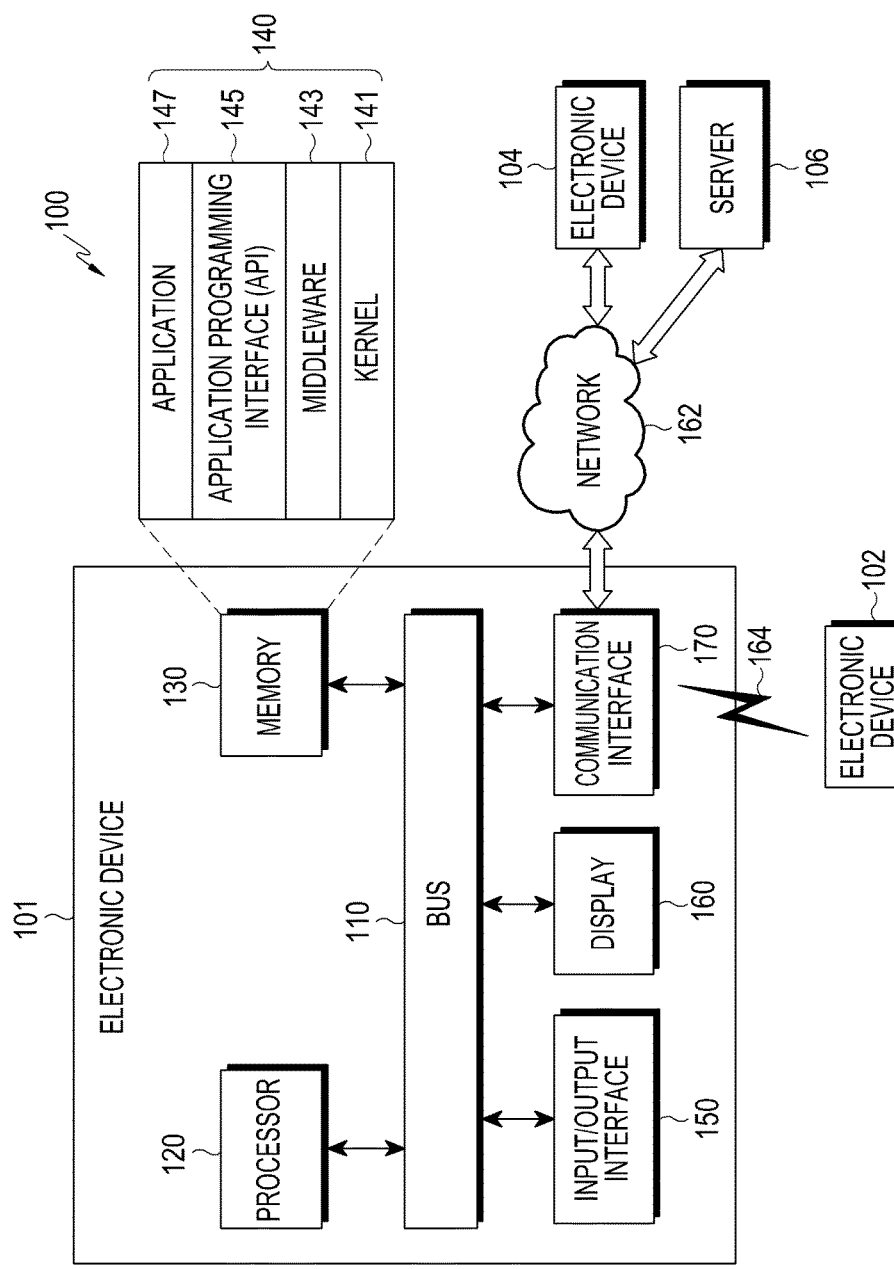
FIG. 1 illustrates a network environment including an electronic device according to various embodiments of the present disclosure.

Hereinafter, the present disclosure will be described with reference to the accompanying drawings. Various changes may be made to the present disclosure and the present disclosure may have various embodiments, particular embodiments of which will be described in detail with reference to the drawings. However, the embodiments according to the concept of the present disclosure are not construed as limited to specified disclosures, and include all changes and/or equivalents, or substitutes that do not depart from the spirit and technical scope of the present disclosure. In regard to the description of the drawings, like reference numerals refer to like elements.

The term "include" or "may include" used in the present disclosure is to indicate the presence of functions, operations, elements, or the like invented therein, and does not preclude the presence or addition of one or more functions, operations, elements, or the like. The term "include" or "has" used in the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

In the present disclosure, the term "or" includes any one and all combinations of the associated listed items. For example, the expression "A or B" may include A, may include B, or may include both A and B.

While expressions such as "first" and "second", as used in various embodiments of the present disclosure may modify various elements of the present disclosure, such elements are not limited by the above expressions. For example, the above expressions do not limit the sequence and/or importance of the corresponding elements. The expressions may be used for distinguishing one element from another element. For example, both a first user device and a second user device may be user devices and represent different user devices. For example, a first element may be named as a second element without departing from the right scope of the various exemplary embodiments of the present disclosure, and similarly, a second element may be named as a first element.

When an element is referred to as being "connected" or "accessed" to or by any other element, it should be understood that the element may be directly connected or accessed by the other element, but another new element may also be interposed between them. Contrarily, when an element is referred to as being "directly connected" or "directly accessed" to or by any other element, it should be understood that there is no element between the element and the other element.

The terms used in the various exemplary embodiments of the present disclosure are for the purpose of describing particular exemplary embodiments only and are not intended to be limiting. The singular forms are intended to include the plural forms as well, unless the context clearly indicates otherwise.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology and should not be interpreted as having ideal or exaggerated meanings unless they are clearly defined in the present disclosure.

An electronic device according to the present disclosure may be a device having a display control function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance having a display control function. The smart home appliances may include at least one of a television (TV), a digital video disk (DVD) player, audio equipment, a refrigerator, an air conditioner, a vacuum cleaner, an oven, a microwave oven, a laundry machine, an air cleaner, a set-top box, a TV box (e.g., HomeSync™ of Samsung, TV™ of Apple, or TV™ of Google), a game console, an electronic dictionary, an electronic key, a camcorder, and an electronic frame.

According to some embodiments, the electronic device may include at least one of various medical equipment (e.g., magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM) of financial companies, a point of sales (POS) of stores, and so forth.

According to some embodiments, the electronic device may include at least one of a part of a furniture or building/structure including a display control function, an electronic board, an electronic signature input device, a projector, and various measuring instruments (e.g., a water, electricity, gas, electric wave measuring device, etc.). The electronic device according to the present disclosure may be one of the above-listed devices or a combination thereof. The electronic device according to the present disclosure may be a flexible device. Further, it will be apparent to those skilled in the art that the electronic device according to the present disclosure is not limited to the aforementioned devices.

Hereinafter, an electronic device according to various embodiments of the present disclosure will be described with reference to the accompanying drawings. The term "user" used in various embodiments may refer to a person who uses the electronic device or a device (e.g., an artificial intelligence electronic device) using the electronic device.

FIG. 1 illustrates a network environment including an electronic device according to various embodiments of the present disclosure.

Referring to FIG. 1, a network environment 100 according to various embodiments of the present disclosure may include an electronic device 101. The electronic device 101 may include a bus 110, a processor 120, a memory 130, an input/output (I/O) interface 150, a display 160, a communication interface 170, and a screen controller 180. According to some embodiments, the electronic device 101 may omit at least one of the foregoing elements or may further include other elements.

The electronic device according to various embodiments of the present disclosure may include various electronic devices that are capable of transmitting and receiving data and are capable of performing an arbitrary operation by transmitting or receiving biometric information. The electronic device may include a smartphone, a portable phone, a laptop, a door-lock, an air conditioner, a laundry machine, a note PC, a tablet PC, a smart TV, and so forth.

The bus 110 may include a circuit for interconnecting the elements and delivering communication (e.g., a control message and/or data) between the elements.

The processor 120 may include one or more of a central processing unit (CPU), an application processor (AP), and a communication processor (CP). The processor 120 may perform an operation or data processing for control or communication of at least one other elements (e.g., the memory 130, the I/O interface 150, the display 160, and the communication interface 170) of the electronic device 101 through the bus 110.

The memory 130 may include a volatile and/or nonvolatile memory. The memory 130 stores an instruction or data received from or generated by the processor 120 or other elements. According to various embodiments, the memory 130 may store software or a program 140. The program 140 may include, for example, a kernel 141, middleware 143, an application programming interface (API) 145, an application program (or "application") 147, and the like. At least a part of the kernel 141, the middleware 143, or the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application 147). The kernel 141 provides an interface through which the middleware 143, the API 145, or the application 147 accesses separate components of the electronic device 101 to control or manage the system resources.

The middleware 143 may work as an intermediary for allowing, for example, the API 145 or the application 147 to exchange data in communication with the kernel 141. The middleware 143 may perform control (e.g., scheduling or load balancing) with respect to task requests received from the application 147 by assigning a priority to at least one of the application 147, which makes it possible to use a system resource (e.g., the bus 110, the processor 120, the memory 130, or the like) of the electronic device 101.

The API 145 is an interface used for the application 147 to control a function provided by the kernel 141 or the middleware 143, and may include, for example, at least one interface or function (e.g., an instruction) for file control, window control, image processing, character control, or the like.

The I/O interface 150 serves as an interface for delivering instructions or data input from a user through an I/O device (e.g., a sensor, a keyboard, or a touch screen) to at least one other component(s) of the electronic device 101. The I/O interface 150 may also output instructions or data received from other component(s) of the electronic device 101 to a user or another external device.

The display 160 displays various information (e.g., multimedia data, text data, or the like) to the user. The display 160 may include, for example, a liquid crystal display (LCD), a light emitting diode (LED) display, an organic light emitting diode (OLED) display, a microelectromechanical system (MEMS) display, or an electronic paper display. The display 160 may display, for example, various contents (e.g., a text, an image, video, an icon, a symbol, etc.) to the user. The display 160 may include a touch screen, and receives a touch, a gesture, proximity, or a hovering input, for example, by using an electronic pen or a part of a body of the user.

The communication interface 170 establishes communication between the electronic device 101 and an external device (e.g., a first external electronic device 102, a second external electronic device 104, or a server 106). For example, the communication interface 170 may be connected to a network 162 through wireless communication and wired communication to communicate with the external device The wireless communication may include at least one of, for example, Wireless Fidelity (WiFi), Bluetooth (BT), near field communication (NFC), a global positioning system (GPS), and cellular communication (e.g., Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or a Global System for Mobile Communications (GSM)). The wired communication may include, for example, at least one of a universal serial bus (USB), a high-definition multimedia interface (HDMI), recommended standard 232 (RS-232), and a plain old telephone service (POTS).

According to various embodiments, the network 162 may be a communication network. The communication network may include at least one of a computer network, Internet, Internet of things (IoT), and a telephone network. According to an embodiment, a protocol (e.g., a transport layer protocol, a data link layer protocol, or a physical layer protocol) for communication between the electronic device 101 and an external device (e.g., the first external electronic device 102 or the second external electronic device 104) may be supported by at least one of the application 147, the application programming interface 145, the middleware 143, the kernel 141, and the communication interface 170.

Each of the first external electronic device 102 and the second external electronic device 104 may be a device of the same type as or a different type than the electronic device 101. According to an embodiment, the server 106 may include a group of one or more servers. According to various embodiments, some or all of operations performed by the electronic device 101 may be performed in another electronic device or a pluraltiy of electronic devices (e.g., the first external electronic device 102, the second external electronic device 104, or the server 106). According to an embodiment, when the electronic device 101 has to perform a function or a service automatically or at a request, the electronic device 101 may request another device (e.g., the first electronic device 102, the second electronic device 104, or the server 106) to perform at least some functions associated with the function or the service, instead of or in addition to executing the function or the service. The another electronic device (e.g., the first electronic device 102, the second electronic device 104, or the server 106) may execute the requested function or additional function and deliver the execution result to the electronic device 101. The electronic device 101 may then process or further process the received result to provide the requested function or service. To this end, for example, cloud computing, distributed computing, or client-server computing may be used.

The screen controller 180 supports driving of the electronic device 101 by performing at least one of operations (or functions) implemented in the electronic device 101. According to various embodiments, at least one element of the screen controller 180 may be included in the server 106, and at least one operation implemented in the screen controller 180 may be supported by the server 106.

The screen controller 180 processes at least a part of information obtained from other elements (e.g., the processor 120, the memory 130, the I/O interface 150, and the communication interface 170) and uses the information in various ways. For example, using or independently of the processor 120, the screen controller 180 may control at least some functions of the electronic device 101 to cause the electronic device 101 to interwork with another electronic device (e.g., the (first?) electronic device 102, the (second?) electronic device 104, or the server 106). The screen controller 180 may be integrated in the processor 120 or the communication interface 170. According to an embodiment, at least one element of the screen controller 180 may be included in the server 106, and at least one operation implemented in a screen control server module (the screen controller 180?) may be supported by the server 106. The screen controller 180 may be further described in more detail with reference to FIGS. 2 through 15.

Figure 2:
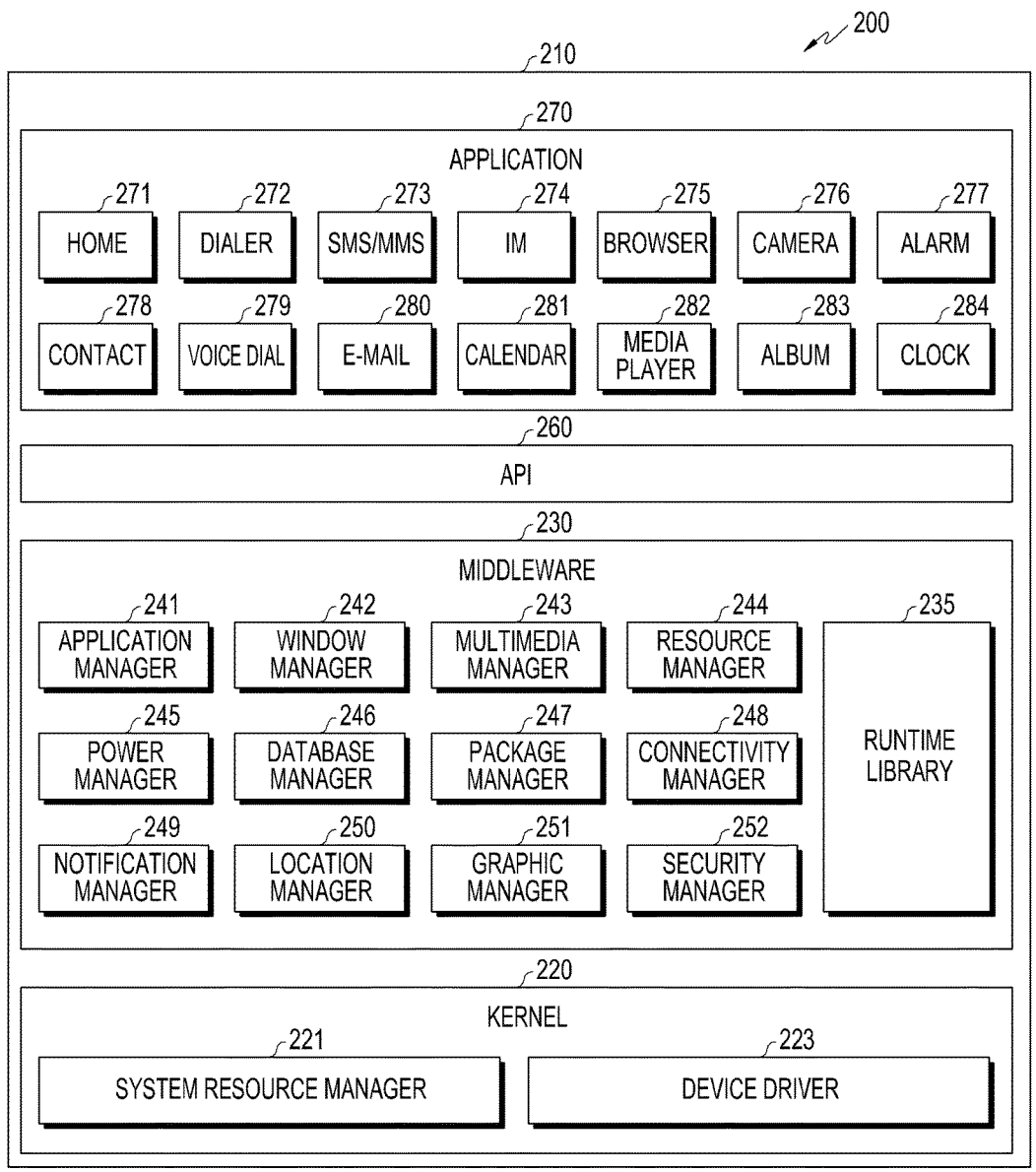
FIG. 2 is a block diagram of a programming module according to various embodiments of the present disclosure.

FIG. 2 is a block diagram of a programming module 210 according to various embodiments of the present disclosure. According to an embodiment, a programming module 210 (e.g., the program 140) may include an OS for controlling resources associated with an electronic device (e.g., the electronic device 101) and/or various applications (e.g., the application program 147) executed on the OS. The OS may include Android, iOS, Windows, Symbian, Tizen, or Bada.

The programming module 210 may include, for example, a kernel 220, middleware 230, an API 260, and/or an application 270. At least a part of the programming module 210 may be preloaded on an electronic device or may be downloaded from a server (e.g., the server 106).

The kernel 220 (e.g., the kernel 141 of FIG. 1) may include, for example, a system resource manager 221 or a device driver 223. The system resource manager 221 may perform control, allocation, retrieval of system resources, and so forth. According to an embodiment, the system resource manager 221 may include a process management unit, a memory management unit, a file system management unit, or the like. The device driver 223 may include, for example, a display driver, a camera driver, a Bluetooth driver, a shared memory driver, a USB driver, a keypad driver, a WiFi driver, an audio driver, or an inter-process communication (IPC) driver.

The middleware 230 may provide functions that the application 270 commonly requires or provide various functions to the application 270 through the API 260 to allow the application 270 to efficiently use a limited system resource in the electronic device. According to an embodiment, the middleware 230 (e.g., the middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include a library module that a compiler uses to add a new function through a programming language while the application 270 is executed. The runtime library 235 performs functions relating to input/output management, memory management, or an arithmetic function.

The application manager 241 manages a life cycle of at least one application, for example, among the applications 270. The window manager 242 manages a GUI resource used in a screen. The multimedia manager 243 recognizes a format necessary for playing various media files and performs encoding or decoding on a media file by using a codec appropriate for a corresponding format. The resource manager 244 manages a resource such as a source code, a memory, or a storage space of at least one application among the applications 270.

The power manager 245 manages a battery or power in operation with, for example, a basic input/output system (BIOS) and provides power information necessary for an operation of the electronic device. The database manager 246 generates, searches or changes a database used for at least one application among the applications 270. The package manager 247 manages the installation or update of an application distributed in a package file format.

The connectivity manager 248 manages a wireless connection such as a WiFi or Bluetooth connection. The notification manager 249 displays or notifies events such as arrival messages, appointments, and proximity alerts in a manner that is not disruptive to a user. The location manager 250 manages location information of the electronic device. The graphic manager 251 manages a graphic effect to be provided to the user or a user interface relating thereto. The security manager 252 provides a general security function necessary for system security, user authentication, etc. According to an embodiment, if the electronic device (e.g., the electronic device 101) has a call function, the middleware 230 may further include a telephony manager for managing a voice or video call function of the electronic device.

The middleware 230 may include a middleware module forming a combination of various functions of the above-mentioned elements. The middleware 230 may provide modules specified according to types of an OS so as to provide distinctive functions. Additionally, the middleware 230 may delete some of existing elements or add new elements dynamically.

The API 260 (e.g., the API 145), which is a set of API programming functions, may be provided with a different configuration according to the OS. In the case of Android or iOS, for example, one API set may be provided for each platform, and in the case of Tizen, two or more API sets may be provided for each platform.

The application 270 (e.g., the application program 147) may include one or more applications capable of providing a function, for example, a home application 271, a dialer application 272, a short messaging service/multimedia messaging service (SMS/MMS) application 273, an instant message (IM) application 274, a browser application 275, a camera application 276, an alarm application 277, a contact application 278, a voice dial application 279, an e-mail application 280, a calendar application 281, a media player application 282, an album application 283, a clock application 284, a health care application (e.g., an application for measuring an exercise amount, a blood sugar, etc.), or an environment information providing application (e.g., an application for providing air pressure, humidity, temperature information, etc.).

According to an embodiment, the application 270 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user. The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service (e.g., a call service or a message service) provided by an application operating on the external electronic device or provided by the external electronic device.

According to an embodiment, the application 270 may include an application (e.g., a health care application) set on the basis of an attribute (e.g., a mobile medical appliance as a type of the electronic device) of the external electronic device (e.g., the electronic device 102 or 104). According to an embodiment, the application 270 may include an application received from the external electronic device (e.g., the server 106 or the electronic device 102 or 104). According to an embodiment, the application 270 may include a preloaded application or a third party application that may be downloaded from the server. Names of elements of the programming module 210 according to the illustrated embodiment may vary depending on a type of an OS.

According to various embodiments, at least a part of the programming module 210 may be implemented by software, firmware, hardware, or a combination of at least two of them. The at least a part of the programming module 210 may be implemented (e.g., executed) by a processor (e.g., the processor 120). At least a part of the programming module 210 may include, for example, modules, programs, routines, sets of instructions, or processes for performing one or more functions.

Figure 3:
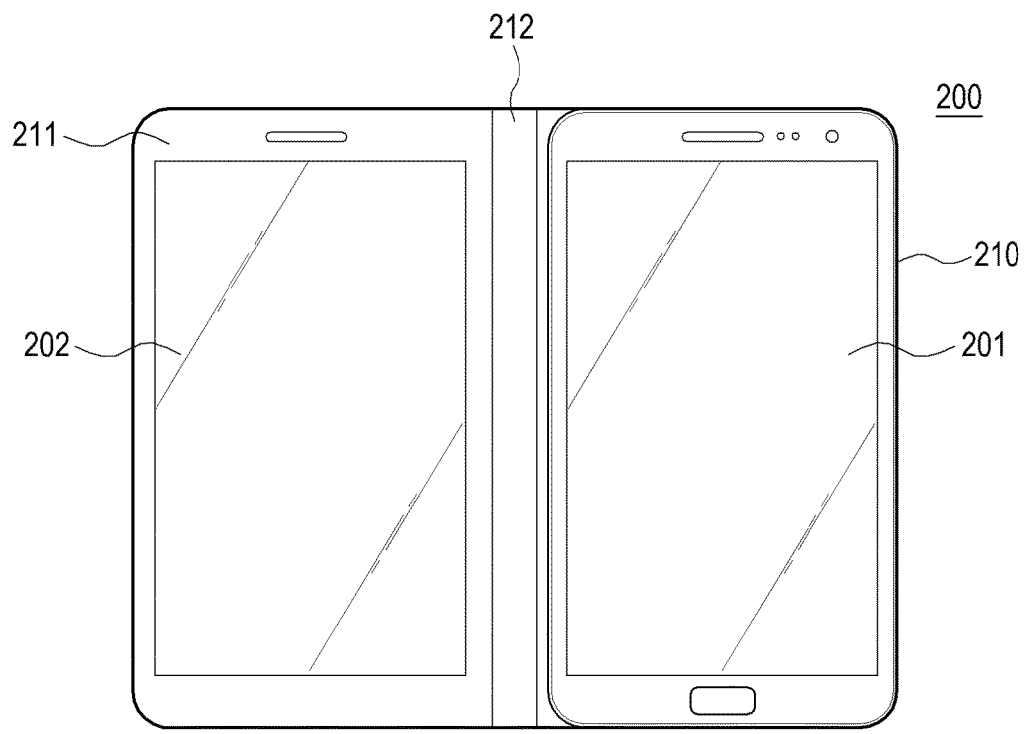
FIG. 3 shows a state where a first display and a second display of an electronic device are activated as dual displays by being unfolded according to an embodiment of the present disclosure.
Figure 4A:
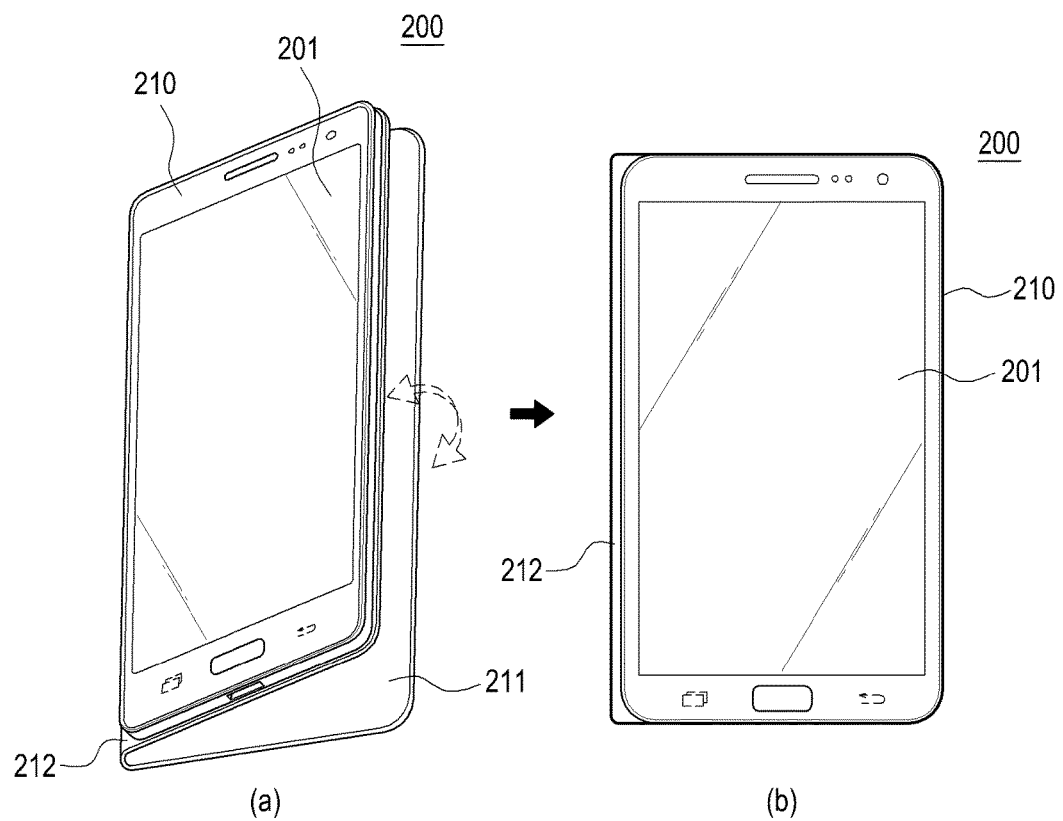
FIG. 4A shows a state where a first display and a second display of an electronic device are activated as a single display by being folded according to an embodiment of the present disclosure.
Figure 4B:
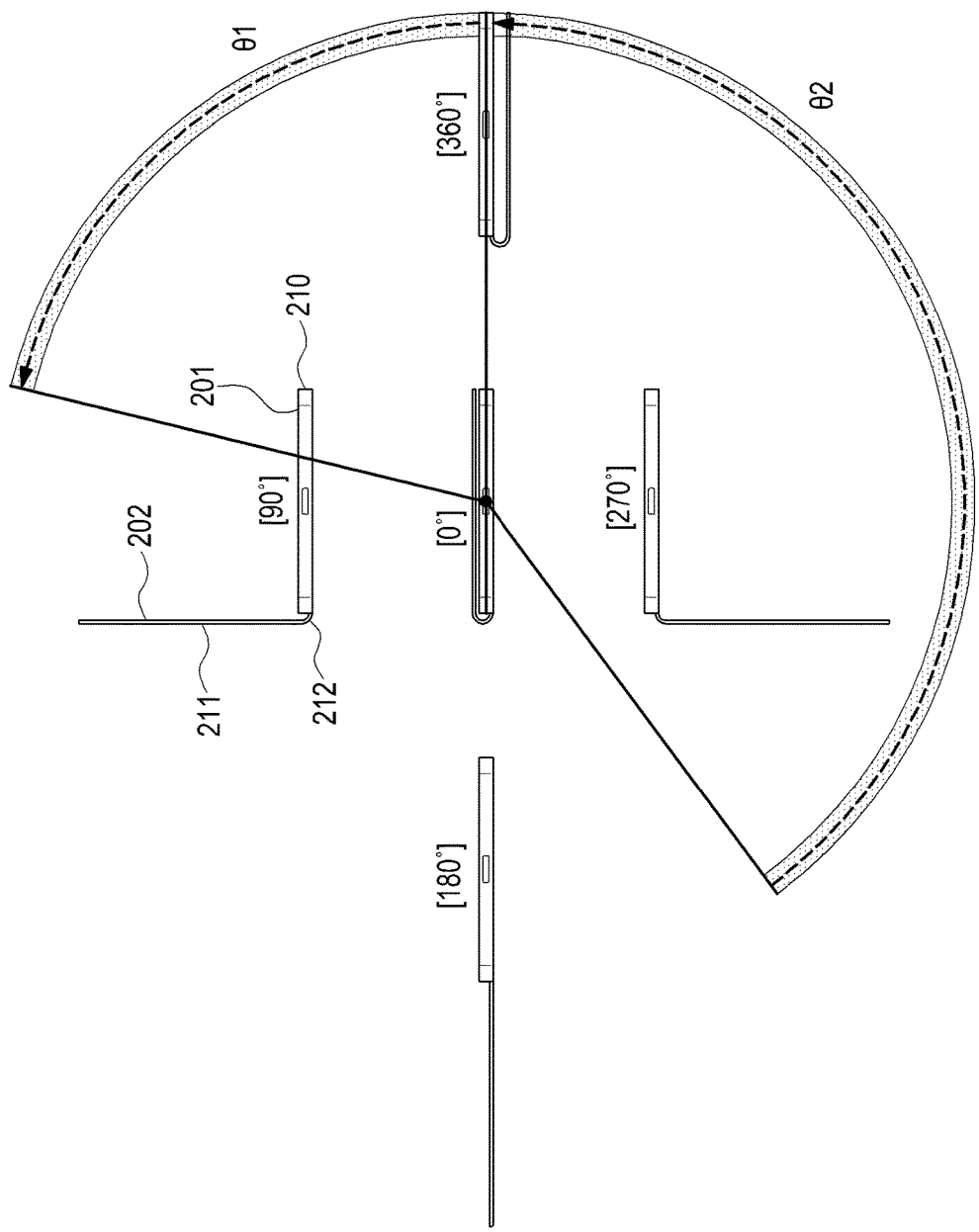
FIG. 4B is a view for describing a concept of an idle mode operation depending on a relative angle between a first display and a second display of an electronic device according to an embodiment of the present disclosure.

FIG. 3 shows a state where a first display and a second display of an electronic device are activated as dual displays by being unfolded according to an embodiment of the present disclosure, FIG. 4A shows a state where the first display and the second display of the electronic device are activated as a single display by being folded according to an embodiment of the present disclosure, and FIG. 4B is a view for describing a concept of an idle mode operation depending on a relative angle between the first display and the second display of the electronic device according to an embodiment of the present disclosure. For reference, (a) of FIG. 4A shows an example in which an electronic device 200 is folded or unfolded, and (b) of FIG. 4A shows an example in which the electronic device 200 is folded such that a first display 201 is shown to a user.

Referring to FIGS. 3, 4A, and 4B, the electronic device 200 according to an embodiment of the present disclosure controls a plurality of displays, and may include a main body portion 210 including the first display 201, a cover portion 211 including a second display 202, and a connection portion 212 for connecting the main body portion 210 and the cover portion 211 by a hinge or flexible plastic in such a way that the main body portion 210 and the cover portion 211 are folded and unfolded with respect to each other in a range of 360 degrees. The electronic device 200 may be any device, such as a portable phone, a laptop, a tablet PC, a PMP, etc., configured to allow the first display 201 and the second display 202 to move relative to each other.

By using the first display 201 and the second display 202 that are physically or graphically separated from each other, the electronic device 200 may support a dual display mode in which the first display 201 and the second display 202 are activated by being unfolded as shown in FIG. 3 or a single display mode in which the first display 201 and the second display 202 are folded and thus the second display 202 is deactivated and the first display 201 is activated as shown in FIG. 4A.

The electronic device 200 shown in FIG. 3 is in a state where the main body portion 210 including the first display 201 and the cover portion 211 including the second display 202 are situated in parallel with each other and a relative angle therebetween is 180 degrees or close to 180 degrees in a predetermined range, that is, the electronic device 200 is in an unfolded state, which may be called a dual display mode where the first display 201 and the second display 202 may be activated. For example, when the relative angle between the first display 201 of the main body portion 210 and the second display 202 of the cover portion 211 is within a range from 175 degrees to 185 degrees, the electronic device 200 may regard the first display 201 and the second display 202 as being unfolded. The dual display mode may provide various view modes, such as a view mode in which two task screens for two applications are displayed on the two first display 201 and second display 202, respectively, a view mode in which two task screens for one application are displayed on the two first display 201 and second display 202, respectively, a view mode in which one task screen for one application is displayed large across the two first display 201 and second display 202, and so forth. If there is no application executed in any one of the first display 201 and the second display 202, the corresponding display may display a home screen.

The electronic device 200 shown in FIG. 4A is in a state where the main body portion 210 including the first display 201 and the cover portion 211 including the second display 202 contact each other oppositely and outwardly, that is, in a completely outwardly folded state, which may be called a single display mode in which any one of the first display 201 and the second display 202 enters an idle mode where it is deactivated and the other display is activated. In this case, the relative angle is 360 degrees. The single display mode may be useful for a call application in a lock state where the electronic device 200 is not used. The front surface or the predefined first display 201 displays a task screen for at least one application, and the rear surface or the predefined second display 202 may be deactivated. Some applications may activate the second display 202 by using an option menu.

Referring to FIG. 4B, the electronic device 200 may be folded or unfolded from a state corresponding to a relative angle of 0 degree where the cover portion 211 including the second display 202 is folded to close the main body portion 210 including the first display 201 with respect to the connection portion 212 to a state corresponding to a relative angle of 360 degrees where the cover portion 211 is folded to be bent back from the main body portion 210.

The electronic device 200 may determine the relative angle between the first display 201 of the main body portion 210 and the second display 202 of the cover portion 211 to control which one of the first display 201 and the second display 202 is to enter the idle mode.

For example, the electronic device 200 may control any one of the first display 201 of the main body portion 210 and the second display 202 of the cover portion 211, which is out of a use range (or available range) or a visible range of the user, to enter the idle mode, and as shown in FIG. 4B, when the cover portion 211 is unfolded, the electronic device 200 may control the second display 202 of the cover portion 211 to enter the idle mode until the relative angle reaches a predetermined first threshold angle θ1. The first threshold angle θ1 may be set in a range of 0 degree to 80 degrees where the second display 202 is covered with the cover portion 211 or is out of the available range of the user. If the cover portion 211 is bent back, the second display 202 of the cover portion 211 is controlled to enter the idle mode when the relative angle increases more than a predetermined second threshold angle θ2. The second threshold angle θ2 may be set in a range of 200 degrees to 360 degrees where the second display 202 is covered with the main body portion 210 or is out of the available range of the user.

Although not shown, the electronic device according to another embodiment of the present disclosure may be configured such that a flexible display is graphically separated as being freely bent or folded.

Figure 5:
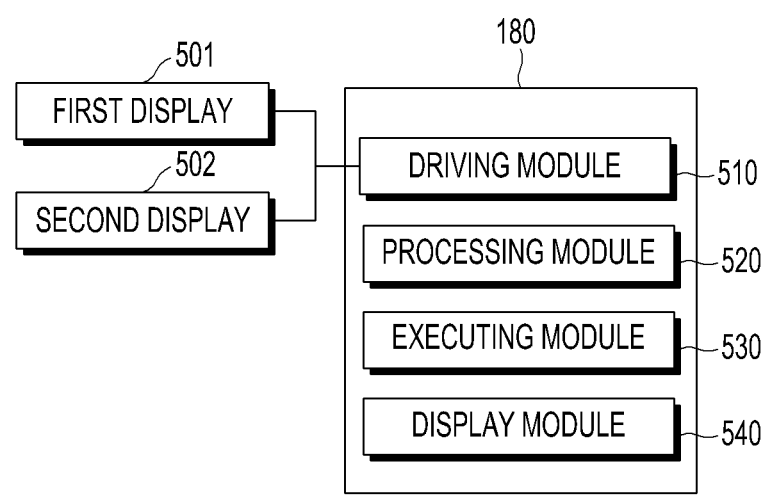
FIG. 5 is a block diagram of a screen controller of an electronic device that controls a plurality of displays according to an embodiment of the present disclosure.

FIG. 5 is a block diagram of a screen controller of an electronic device that controls a plurality of displays according to an embodiment of the present disclosure.

Referring to FIG. 5, an electronic device for controlling a plurality of displays according to an embodiment of the present disclosure may include a first display 501 and a second display 502, and the screen controller 180 of the electronic device may include at least some or all of a driving module 510, a processing module 520, an executing module 530, and a display module 540. The screen controller 180 may be provided separately from a processor (e.g., the processor 120) or may be entirely or partially integrated in the processor.

According to an embodiment, the screen controller 180 executes a plurality of applications, displays execution screens of the plurality of executed applications on the first display 501 and the second display 502, determines whether to activate or deactivate the first display 501 and the second display 502 and a screen currently used by the user when a notification screen (or alert screen) is generated corresponding to information received from an external source or, an execution screen of another application called corresponding to a user input is further generated on an application displayed on any one of the first display 501 and the second display 502, and displays the generated screen on the first display 501 or the second display 502.

In a state where a first application is executed and an execution screen of the first application is displayed on the first display 501 or the second display 502, when displaying of an execution screen of a second application called corresponding to a user input through the first application is requested, the screen controller 180 determines states of the first display 501 and the second display 502; in case of the dual display mode where the first display 501 and the second display 502 are activated, if the execution screen of the first application is displayed on the first display 501, then the screen controller 180 controls the execution screen of the second application to be displayed on the second display 502; in case of the single display mode where the second display 502 is deactivated, if the execution screen of the first application is displayed on the first display 501, then the screen controller 180 controls the execution screen of the second application to be displayed on the first display 501 together with the execution screen of the first application.

In a state where a plurality of applications are executed and execution screens thereof are displayed on the first display 501 or the second display 502, when displaying of a notification screen generated corresponding to information received from an external source is requested, the screen controller 180 determines states of the first display 501 and the second display 502; in case of the dual display mode where the first display 501 and the second display 502 are activated, the screen controller 180 determines which one of the first display 501 and the second display 502 displays a main screen currently used by the user, and for example, if a screen selected last by the user among screens displayed on the first display 501 and the second display 502 or a gaze screen to which a user's gaze is directed is displayed on the first display 501, then the screen controller 180 controls the notification screen generated corresponding to the information received from the external source to be displayed on the second display 502; in case of the single display mode where the second display 502 is deactivated, the screen controller 180 controls the notification screen generated corresponding to the information received from the external source to be displayed in the form of a pop-up on the main screen displayed in the first application.

According to an embodiment, in a state where a plurality of applications are executed and execution screens of the plurality of executed applications or a notification screen generated corresponding to information received from an external source are displayed on the first display 501 or the second display 502, the screen controller 180 determines attributes of screens displayed on the first display 501 and the second display 502.

In the state where the plurality of applications are executed and the execution screens of the plurality of executed applications or the notification screen generated corresponding to the information received from the external source are displayed on the first display 501 or the second display 502, the screen controller 180 determines attributes of a first screen displayed on the first display 501 and a second screen displayed on the second display 502 according to whether the first screen and the second screen have a correlation therebetween. For example, if the first screen displayed on the first display 501 is an execution screen corresponding to the first application and the second screen displayed on the second display 502 is a screen generated corresponding to a user input to the first application, that is, an execution screen of a second application called through the first application, or an information screen that shows detailed information on a new window as an additional function of the first application, then the screen controller 180 may determine that the first screen and the second screen have the correlation. If the second screen displayed on the second display 502 is a notification screen generated corresponding to information received from an external source, the screen controller 180 may determine that the first screen and the second screen have no correlation therebetween.

The screen controller 180 determines which one of the first screen and the second screen is a main screen currently used by the user, depending on the correlation between the first screen displayed on the first display 501 and the second screen displayed on the second display 502. For example, if the first screen and the second screen have the correlation, the screen controller 180 may determine, as the main screen, one of the first screen and the second screen on which the first application calling the other screen is executed. When the first screen and the second screen have no correlation like when the first screen is an execution screen of the first application and the second screen is an execution screen of the second application performing a function that is not related to the first application or when the second screen is a notification screen generated corresponding to information received from an external source, the screen controller 180 may determine, as the main screen, one of the first screen and the second screen which is a selected screen selected last by the user or a gaze screen to which a user's gaze is directed. In particular, when an application for providing a visual effect to the user, such as a video viewer, an image viewer, an electronic (E) book, a browser, etc., is currently executed on at least one of the first screen and the second screen, the screen controller 180 may determine the gaze screen as the main screen.

If the first screen displayed on the first display 501 and the second screen displayed on the second display 502 have a correlation therebetween, the screen controller 180 may determine detailed attributes of the correlation between the first screen and the second screen, depending on whether there is data linkage between the first application on the first screen and the second application on the second screen. For example, when the first screen displayed on the first display 501 is an execution screen corresponding to the first application, the second screen displayed on the second display 502 is an execution screen of the second application called corresponding to a user input to the first application, and the first application has to receive information from the second application; if the first application is an application that provides an e-mail function, a messenger function, or a memo-writing function and the second application is an application such as a gallery that is called by an attachment file call function among functions of the first application and manages contents such as a picture, a moving image, etc., or an address book that manages user's contacts, then the screen controller 180 may determine that detailed attributes of the correlation between the first screen and the second screen have data linkage. When the first screen displayed on the first display 501 is an execution screen corresponding to the first application, the second screen displayed on the second display 502 is an execution screen of the second application called corresponding to a user input to the first application, and the first application and the second application do not share information with each other; if the first application is an application such as an e-mail, a messenger, a planner, etc., and the second application is an application such as a uniform resource locator (URL) address attached on the screen provided by the first application, a browser called by a short-cut function, or a map, then the screen controller 180 may determine that detailed attributes of the correlation between the first screen and the second screen do not have data linkage. When the first screen displayed on the first display 501 is an execution screen corresponding to the first application and the second screen displayed on the second display 502 is an information screen that displays detailed information provided as an additional function of the first application; if the first application is an application such as an e-mail application, a messenger application, etc., and the information screen is a viewer of the first application that allows the user to check in detail contents, etc., attached on the screen provided by the first application, then the screen controller 180 may determine that the detailed attributes of the correlation between the first screen and the second screen do not have data linkage.

According to an embodiment, in the state where the plurality of applications are executed and the execution screens of the plurality of executed applications or the notification screen generated corresponding to the information received from the external source are displayed on the first display 501 or the second display 502, if entry to the idle mode where any one of the first display 501 and the second display 502 is deactivated is requested, the screen controller 180 determines attributes of the first screen on the first display 501 and attributes of the second screen on the second display 502 and determines whether to display a screen on a display that does not enter the idle mode according to attributes of the screen displayed on the other display that enters the idle mode, so as to control a screen layout for displaying the first screen or the second screen on the first display 501 or the second display 502.

If the attributes of the first screen displayed on the first display 501 and the attributes of the second screen displayed on the second display 502 have a correlation therebetween, the screen controller 180 determines whether to display the screen displayed on the display that enters the idle mode on the display that does not enter the idle mode according to the detailed attributes of the correlation between the first screen and the second screen so as to control the first screen or the second screen to be displayed on the first display 501 or the second display 502. For example, when the display entering the idle mode is the second display 502, if the first screen displayed on the first display 501 is an execution screen corresponding to the first application, the second screen displayed on the second display 502 is an execution screen corresponding to the second application that is called corresponding to a user input to the first application and has data linkage with the first application, and the detailed attributes of the correlation between the first screen and the second screen have data linkage, then the screen controller 180 controls the second screen of the second display 502, together with the first screen, to be displayed on the first display 501 that does not enter the idle mode. The layout of the first screen and the second screen may be controlled such that the first screen and the second screen are divided at a predetermined ratio that may be adjusted according to use patterns of the first screen and the second screen. When the display entering the idle mode is the second display 502, if the first screen displayed on the first display 501 is an execution screen corresponding to the first application, the second screen displayed on the second display 502 is an execution screen corresponding to the second application that does not share information with the first application or an information screen that displays detailed information provided as an additional function of the first application, and the detailed attributes of the correlation between the first screen and the second screen have no data linkage, then the screen controller 180 controls the second screen of the second display 502 not to be displayed on the first display 501 that does not enter the idle mode. In this case, the second screen may remain on the deactivated second display 502, or the second application of the second screen may be automatically terminated.

If the attributes of the first screen displayed on the first display 501 and the attributes of the second screen displayed on the second display 502 have no correlation therebetween, the screen controller 180 determines whether to display the screen displayed on the display that enters the idle mode on the display that does not enter the idle mode according to which one of the first screen and the second screen is a main screen, so as to control the first screen or the second screen to be displayed on the first display 501 or the second display 502. For example, when the display that enters the idle mode is the second display 502, the screen controller 180 determines, as a main screen currently used by the user, one of the first screen and the second screen which is a selected screen selected last by the user or a gaze screen to which a user's gaze is directed; if the first screen displayed on the first display 501 is the main screen, the screen controller 180 controls the second screen (sub screen) to be displayed on the first display 501 that does not enter the idle mode. In this case, the layout of the first screen and the second screen may be controlled such that the second screen is displayed in the form of a pop-up on the first screen. If the second screen displayed on the second display 502 is the main screen, the screen controller 180 may control the second screen (main screen) to be displayed on the first display 501 that does not enter the idle mode. In this case, the layout of the first screen and the second screen may be controlled such that a position of the first screen and a position of the second screen are swapped and thus the first screen is displayed in the form of a pop-up on the second screen.

The driving module 510 of the screen controller 180 according to various embodiments of the present disclosure controls driving of the first display 501 and the second display 502. The driving module 510 activates one of the first display 501 and the second display 502, activates both the first display 501 and the second display 502, or controls entry to the idle mode where one of the first display 501 and the second display 502 is deactivated from a state where one or more of the first display 501 and the second display 502 is activated. Herein, the display having entered the idle mode may be in a state where driving of the display is completely off, but may also be in a state where the display is temporarily deactivated and then is activated again upon input of an activation instruction, and in this state, data displayed on the display having entered the idle mode may be shown without disappearing.

The driving module 510 determines the relative angle between the first display 501 and the second display 502 to control which one of the first display 501 and the second display 502 is to enter the idle mode. For example, the driving module 510 may control any one of the first display 501 and the second display 502, which is out of the available range or the visible range of the use, to enter the idle mode, and if the first display 501 and the second display 502 that contact oppositely move away from each other, the driving module 510 may control the second display 502 to enter the idle mode until the relative angle reaches the preset first threshold angle $\theta 1$. For example, the first threshold angle $\theta 1$ may be in a range of 0 degree to 80 degrees. If the second display 502 is bent back from a state where the first display 501 and the second display 502 are situated in parallel with each other, the driving module 510 controls the second display 502 to enter the idle mode when the relative angle increases more than the preset second threshold angle $\theta 2$. For example, the second threshold angle $\theta 2$ may be in a range of 200 degrees to 360 degrees.

The processing module 520 of the screen controller 180 according to various embodiments of the present disclosure executes a plurality of applications, displays execution screens of the plurality of executed applications on the first display 501 and the second display 502, and determines whether to activate or deactivate the first display 501 and the second display 502 and determines a screen currently used by the user when a notification screen is generated corresponding to information received from an external source or, on an application displayed on any one of the first display 501 and the second display 502, an execution screen of another application called corresponding to a user input is further generated, so as to control an additionally generated screen to be displayed on the first display 501 or the second display 502.

In the state where the plurality of applications are executed and execution screens of the plurality of executed applications or a notification screen generated corresponding to the information received from the external source are displayed on the first display 501 or the second display 502, the executing module 530 of the screen controller 180 according to various embodiments of the present disclosure determines attributes of screens displayed on the first display 501 and the second display 502 and determines whether to display the screen on the display that does not enter the idle mode according to the attributes of the screen displayed on the display that enters the idle mode if entry to the idle mode where any one of the first display 501 and the second display 502 is deactivated is requested, so as to control the screen layout for displaying the first screen or the second screen on the first display 501 or the second display 502.

The display module 540 of the screen controller 180 according to various embodiments of the present disclosure displays a screen on the first display 501 or the second display 502 according to screen display control from the driving module 510, the processing module 520, and the executing module 530.

Figure 6:
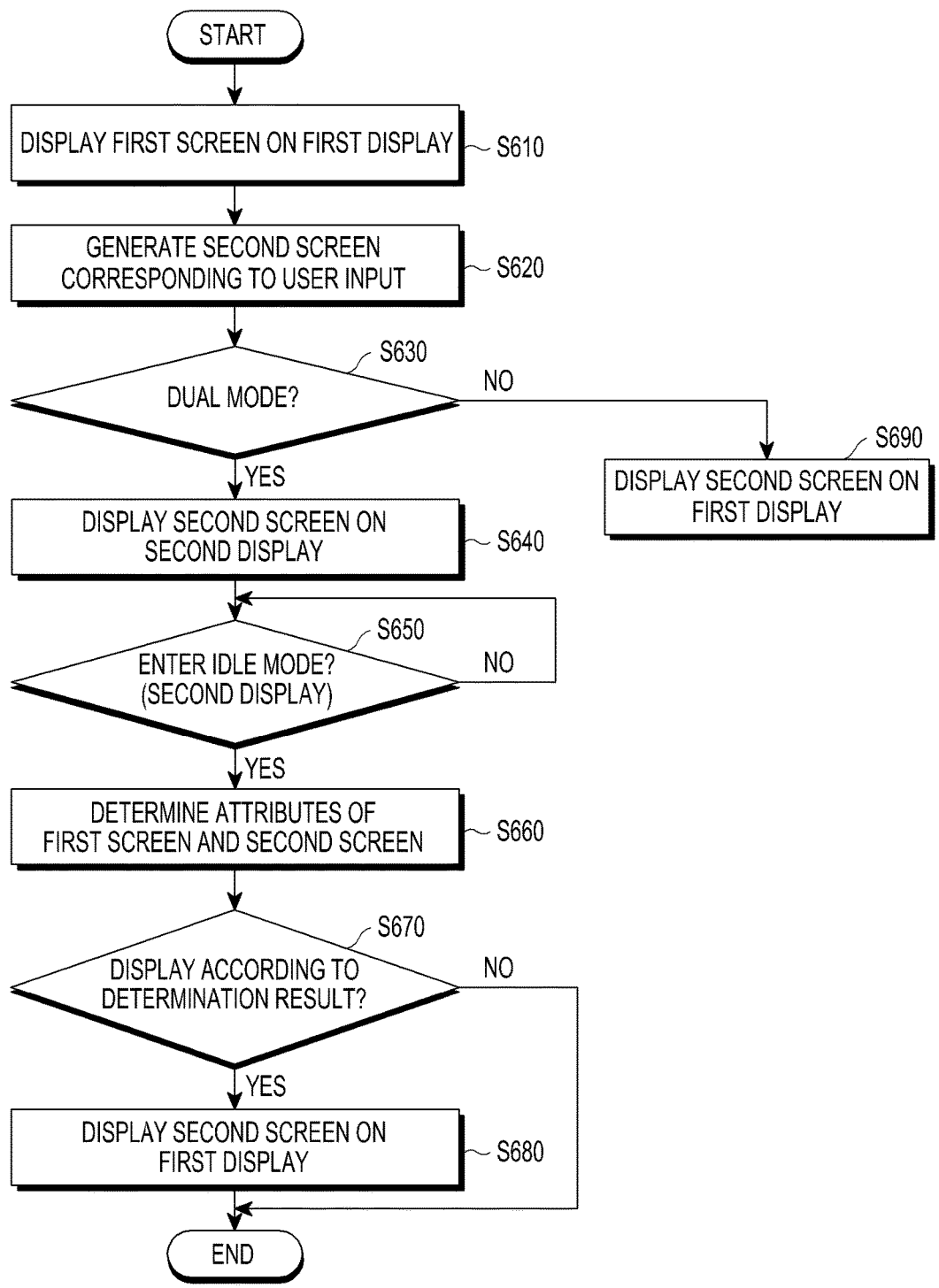
FIG. 6 is a flowchart illustrating a method for controlling a plurality of displays according to an embodiment of the present disclosure.
Figure 7A:
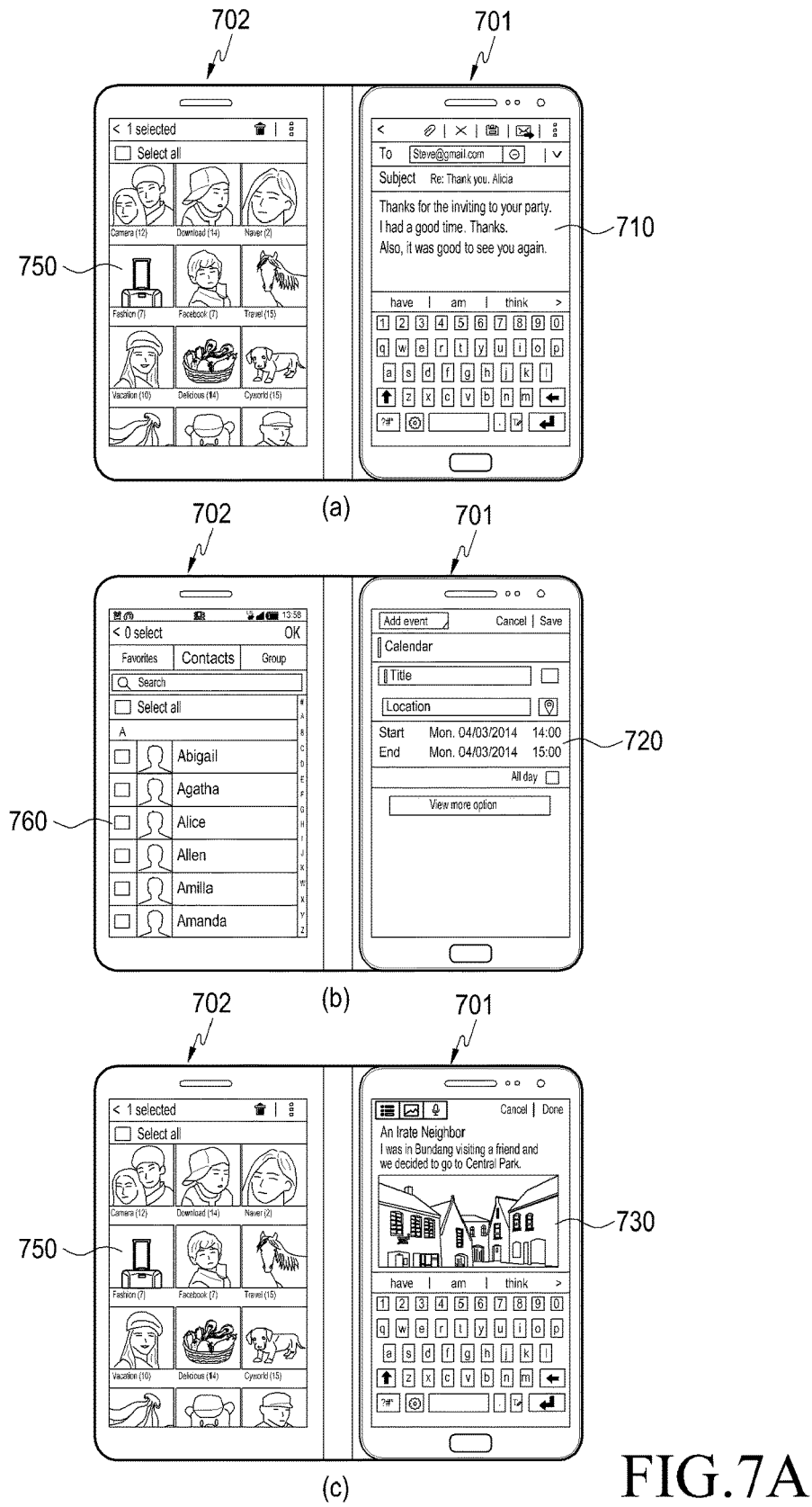
FIGS. 7A and 7B show an example of a method for controlling a plurality of displays according to an embodiment of the present disclosure.
Figure 7B:
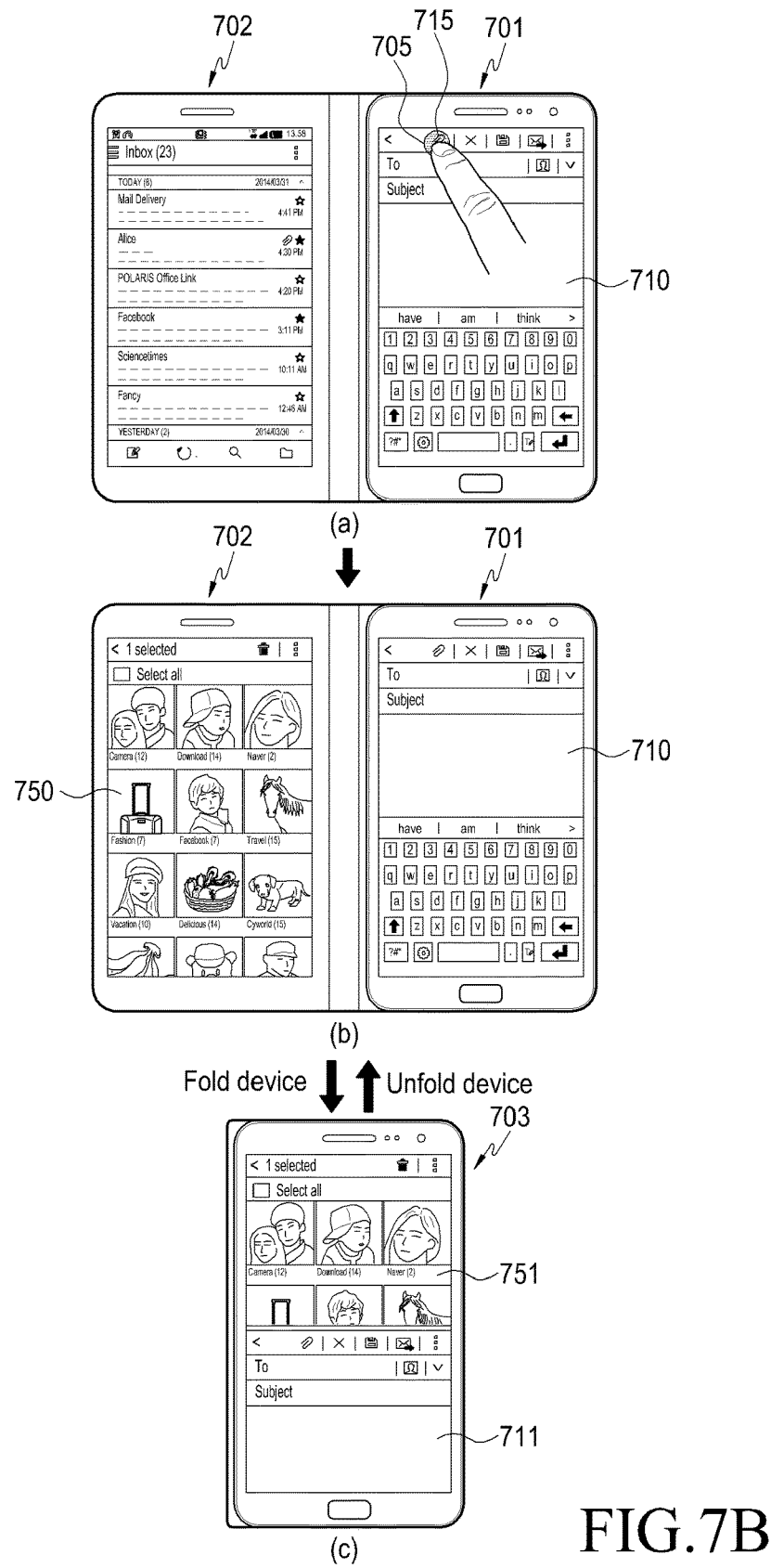
Figure 8A:
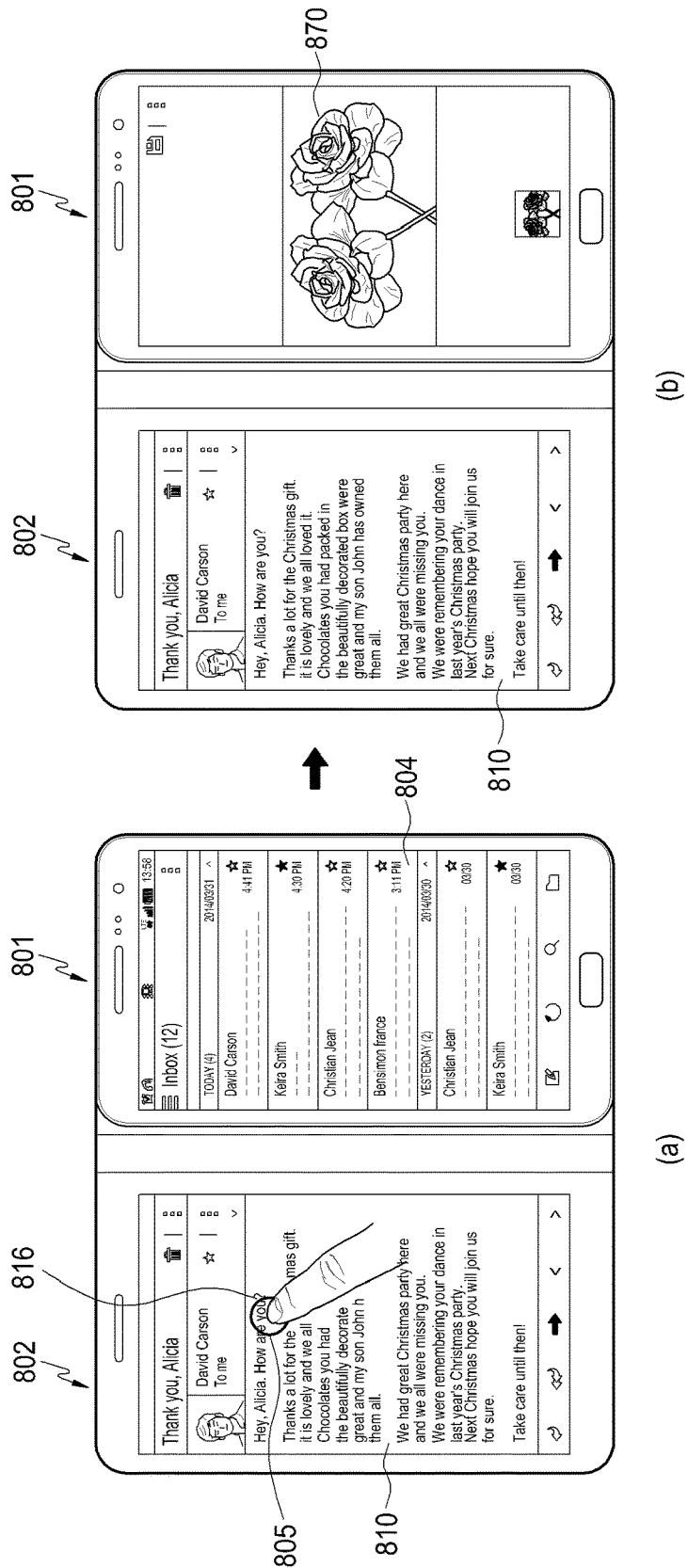
FIGS. 8A and 8B show an example of a method for controlling a plurality of displays according to an embodiment of the present disclosure.
Figure 8B:
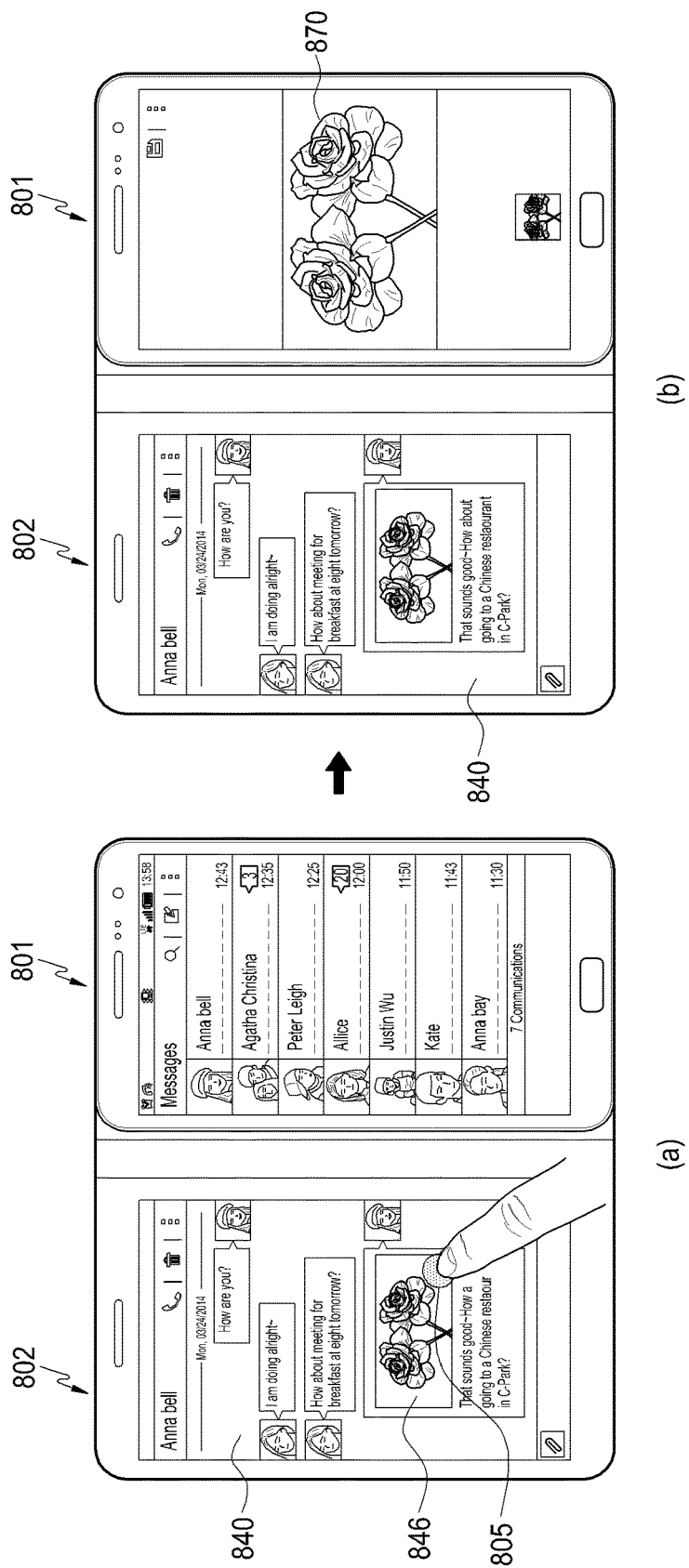
Figure 9A:
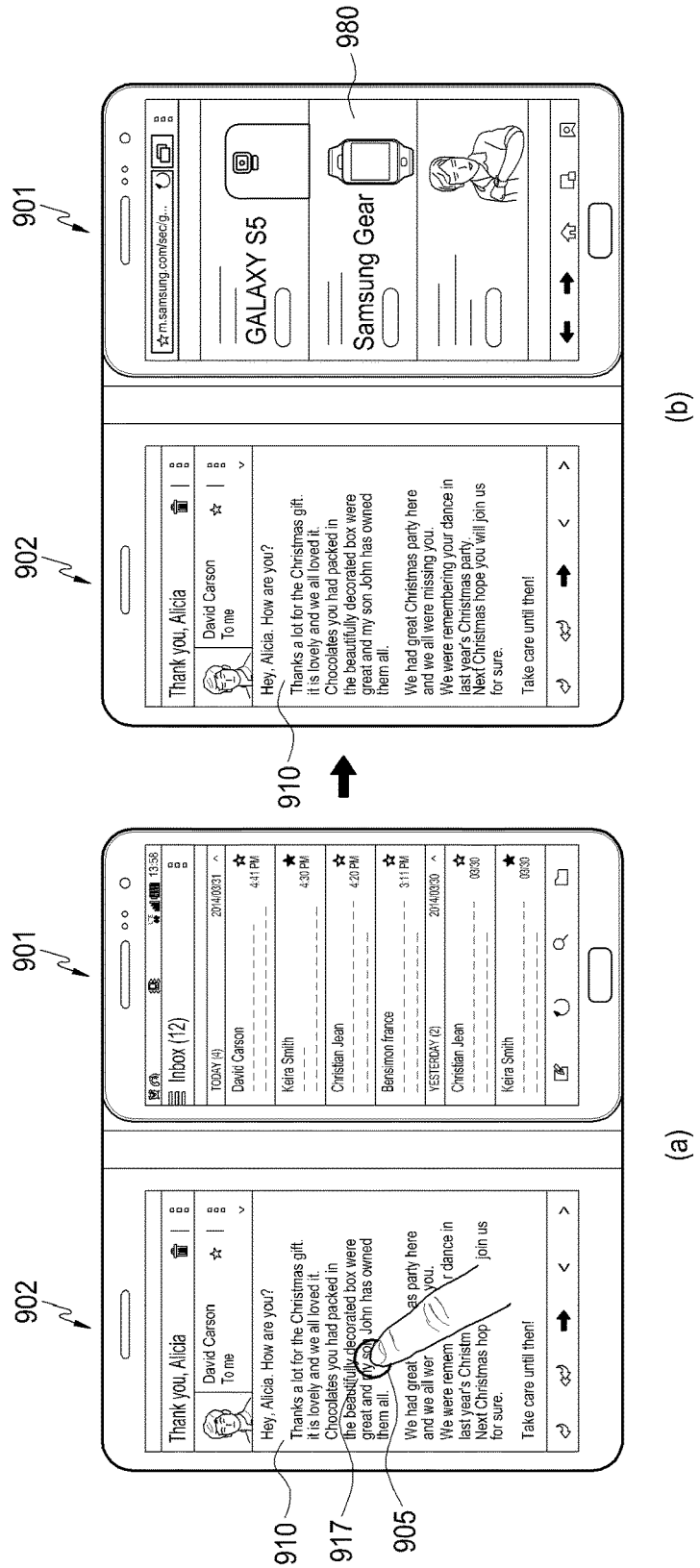
FIGS. 9A and 9B show an example of a method for controlling a plurality of displays according to an embodiment of the present disclosure.
Figure 9B:
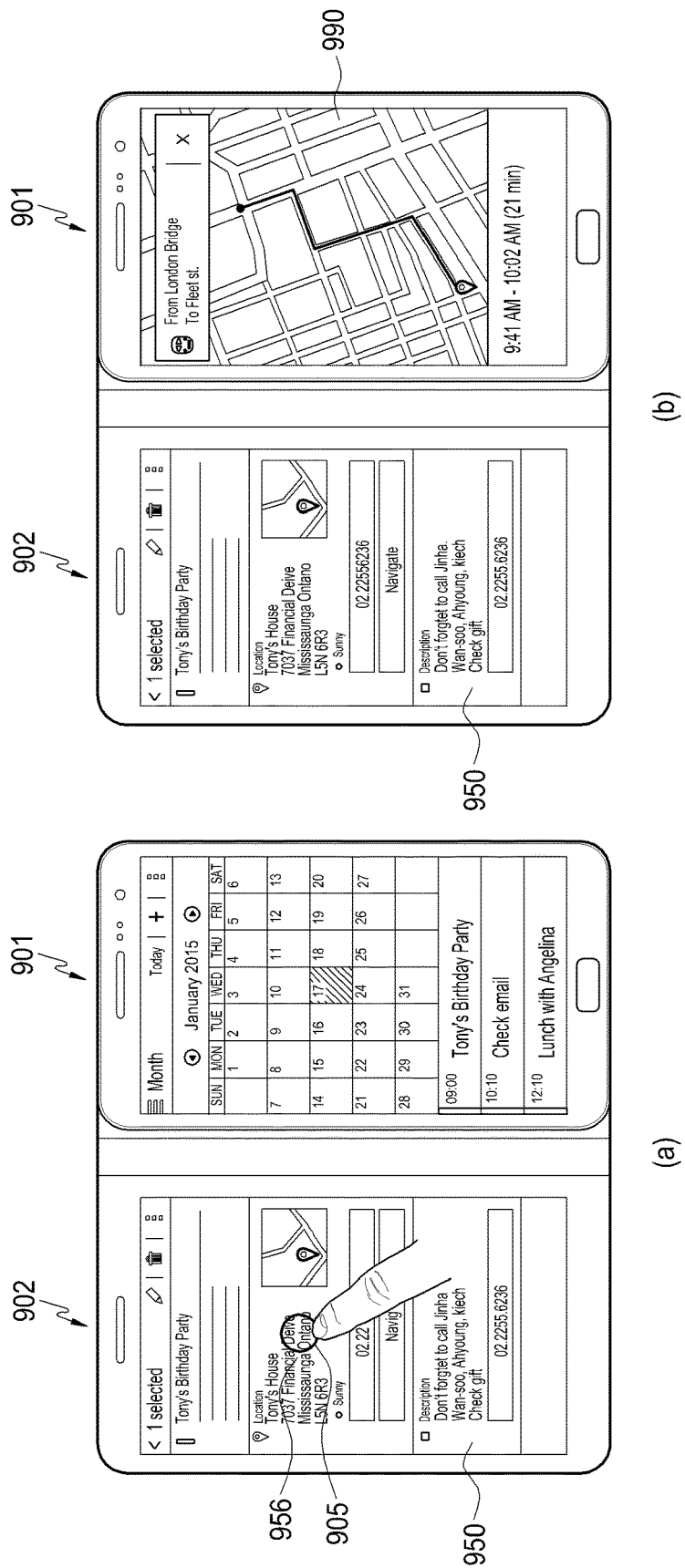
Figure 10:
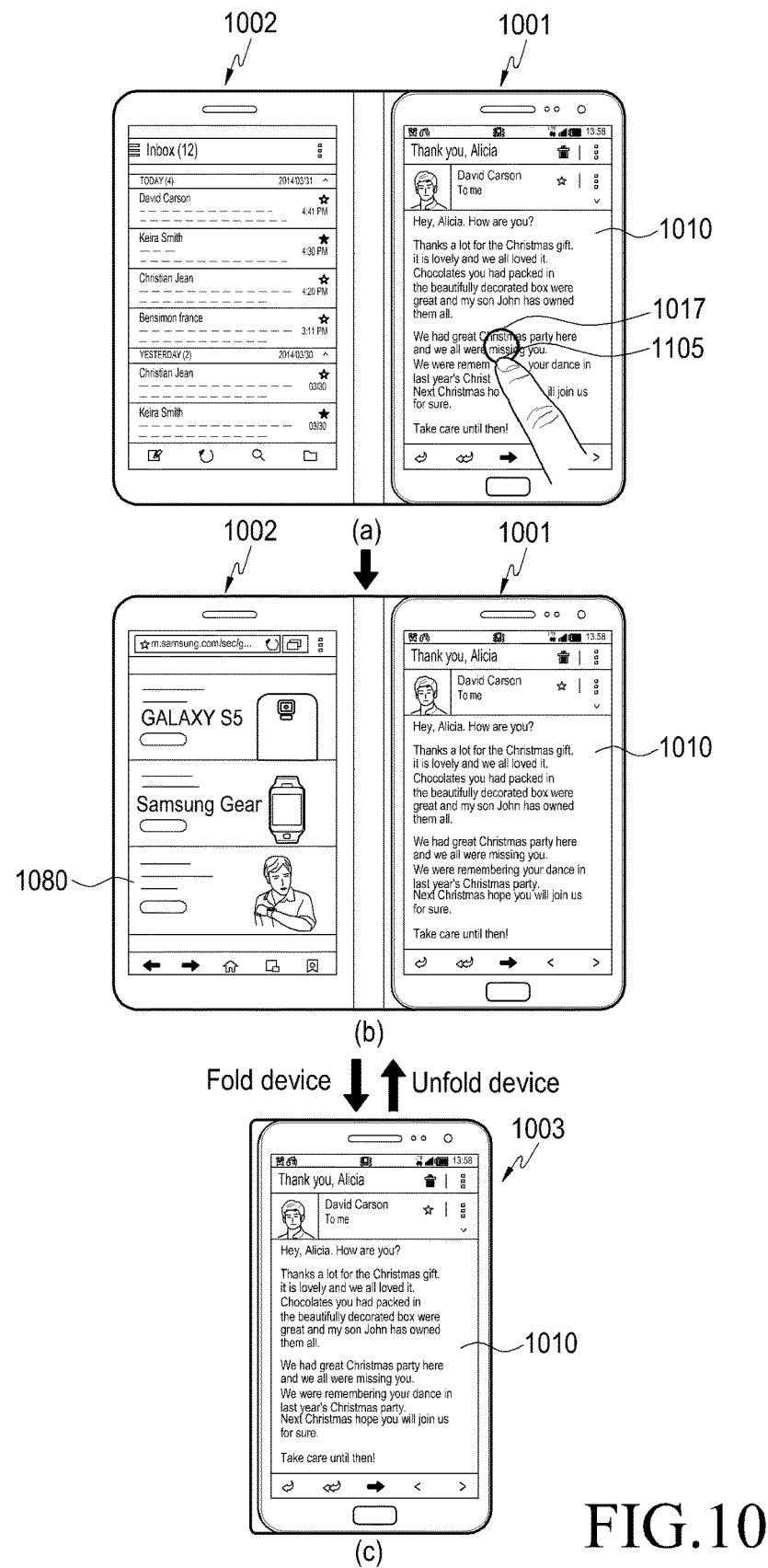
FIG. 10 shows an example of a method for controlling a plurality of displays according to an embodiment of the present disclosure.

FIG. 6 is a flowchart illustrating a method for controlling a plurality of displays according to an embodiment of the present disclosure, FIGS. 7A and 7B show an example of a method for controlling a plurality of displays according to an embodiment of the present disclosure, FIGS. 8A and 8B show an example of a method for controlling a plurality of displays according to an embodiment of the present disclosure, FIGS. 9A and 9B show an example of a method for controlling a plurality of displays according to an embodiment of the present disclosure, and FIG. 10 shows an example of a method for controlling a plurality of displays according to an embodiment of the present disclosure.

Referring to FIGS. 6 and 7A, a method for controlling a plurality of displays according to an embodiment of the present disclosure will be described.

Referring to FIG. 6, the screen controller 180 displays a first screen on the first display 501 in a state where the first display 501 is activated in operation S610, and generates a second screen, which is an execution screen of another application, corresponding to a user input on a first application of the first screen in operation S620.

The screen controller 180 determines whether a mode is a dual display mode where the second display 502 is activated in operation S630, and if so, the screen controller 180 displays the second screen on the second display 502 in operation S640; if the mode is a single display mode where the second display 502 is deactivated, the screen controller 180 displays the second screen on the first display 501 in operation S690.

Then, in operation S650, the screen controller 180 controls the second display 502 to enter the idle mode in a state where the first display 501 and the second display 502 are activated. The display entering the idle mode may be the first display 501, and in this case, subsequent processes may be inverse to the following processes.

If the second display 502 enters the idle mode, the screen controller 180 determines attributes of the first screen displayed on the first display 501 and attributes of the second screen displayed on the second display 502 in operation S660. The operation of determining the attributes of the first screen and the attributes of the second screen is performed based on whether the first screen and the second screen have a correlation therebetween, and if the first screen and the second screen have the correlation, it is determined whether there is data linkage between the first application and the second application that are execution entities of the first screen and the second screen to determine the detailed attributes of the correlation between the first screen and the second screen.

The screen controller 180 determines whether to display the first screen and the second screen according to the attributes of the first screen and the attributes of the second screen in operation S670, and displays the second screen displayed on the second display 502 that enters the idle mode on the first display 501 that does not enter the idle mode in operation S680.

As shown in FIG. 7A which shows an example of data linkage between the first application and the second application, in (a) of FIG. 7A, an execution screen 710 of an e-mail application is displayed on a first display 701 and a gallery application screen 750 called by the e-mail application to attach an attachment file is displayed on a second display 702, in which data linkage is accompanied between the first application and the second application. In (b) of FIG. 7A where an execution screen 720 of a calendar application is displayed on the first display 701 and an address book application screen 760 called to attach an address book in the calendar application is displayed on the second display 702, data linkage is accompanied between the first application and the second application. In (c) of FIG. 7A where an execution screen 730 of a memo application is displayed on the first display 701 and a gallery application screen 750 called to attach an attachment file in the memo application is displayed on the second display 702, data linkage is accompanied between the first application and the second application.

Referring to FIG. 7B, an operation process for an example where data linkage is accompanied between the first application and the second application will be described below.

As shown in (a) of FIG. 7B, the user makes a touch 705 of the user on an attach button 715 on the e-mail application execution screen 710 of the first display 701 to call the gallery application that is data-linked with the e-mail application.

As shown in (b) of FIG. 7B, the gallery application execution screen 750 corresponding to the user input is displayed on the second display 702. If the second display 702 is not activated, the gallery application execution screen 750 is displayed as an upper layer or a pop-up on a top surface of the e-mail application execution screen 710 on the first display 701, or the e-mail application execution screen 710 and the gallery application execution screen 750 are divided and displayed together at a predefined ratio.

As shown in (c) of FIG. 7B, in a state where the e-mail application execution screen 710 is displayed on the first display 701 and the gallery application execution screen 750 is displayed on the second display 702, if the second display 702 enters the idle mode, an e-mail application execution screen 711 and a gallery application execution screen 751 are divided and displayed at a predefined ratio on a display 703 switched to the single display mode. In this state, if the second display 702 is activated again, the screen state may return to the screen shown in (b) of FIG. 7B.

Referring to FIGS. 8A, 8B, 9A, 9B, and 10, a description will be made of an operation process for an example where data linkage is not accompanied between the first application and the second application.

As shown in (a) of FIG. 8A, if an e-mail application execution screen 810 is displayed on a second display 802 and a user's touch 805 is made to check details of an image attached on a text 816 of the e-mail, a separate application is not called; instead, an image viewer supported in the e-mail application is executed and an image viewer screen 870 is displayed on a first display 801 as shown in (b) of FIG. 8A.

As shown in (a) of FIG. 8B, if a messenger application execution screen 840 is displayed on the second display 802 and the user's touch 805 is made to check details of an image attached on a message 846, a separate application is not called; instead, an image viewer supported in the messenger application is executed and the image viewer screen 870 is displayed on the first display 801 as shown in (b) of FIG. 8B.

As shown in (a) of FIG. 9A, if an e-mail application execution screen 910 is displayed on a second display 902 and a user's touch 905 is made to check details of a page linked to a text 917 of the e-mail, a browser application is executed and a browser application execution screen 980 is displayed on a first display 901 as shown in (b) of FIG. 9A. In this case, between the e-mail application and the browser application, only link connection is performed and data linkage is not accompanied, and in case of these attributes, even when the first display 901 on which the browser application execution screen 980 is displayed is deactivated, the browser application execution screen 980 does not move to the activated display or is not rearranged.

As shown in (a) of FIG. 9B, if a planner application execution screen 950 is displayed on the second display 902 and the user's touch 905 is made onto a short cut 956 for checking details of a map on the planner application, a map application is executed and a map application execution screen 990 is displayed on the first display 901 as shown in (b) of FIG. 9B. In this case, between the planner application and the map application, only link connection is performed and data linkage is not accompanied, and in case of these attributes, even when the first display 901 on which the map application execution screen 990 is displayed is deactivated, the map application execution screen 990 does not move to the activated display or is not rearranged.

As such, an overall operation process for an example where data linkage is not accompanied between the first application and the second application will be described below.

As shown in (a) of FIG. 10, the user makes a touch 1105 of the user on an e-mail text 1017 on an e-mail application execution screen 1010 displayed on a first display 1001 to call a browser application that is not data-linked with the e-mail application.

As shown in (b) of FIG. 10, a browser application execution screen 1080 corresponding to the user input is displayed on a second display 1002. If the second display 1002 is not activated, the browser application execution screen 1080 is displayed as an upper layer or a pop-up on a top surface of the e-mail application execution screen 1010 on the first display 1001, or the e-mail application execution screen 1010 and the browser application execution screen 1080 are divided and displayed together at a predefined ratio.

As shown in (c) of FIG. 10, in a state where the e-mail application execution screen 1010 is displayed on the first display 1001 and the browser application execution screen 1080 is displayed on the second display 1002, if the second display 1002 enters the idle mode, the e-mail application execution screen 1010 is displayed on a display 1003 switched to the single display mode and the browser application execution screen 1080 remains on the deactivated second display 1002 or is terminated.

Figure 11:
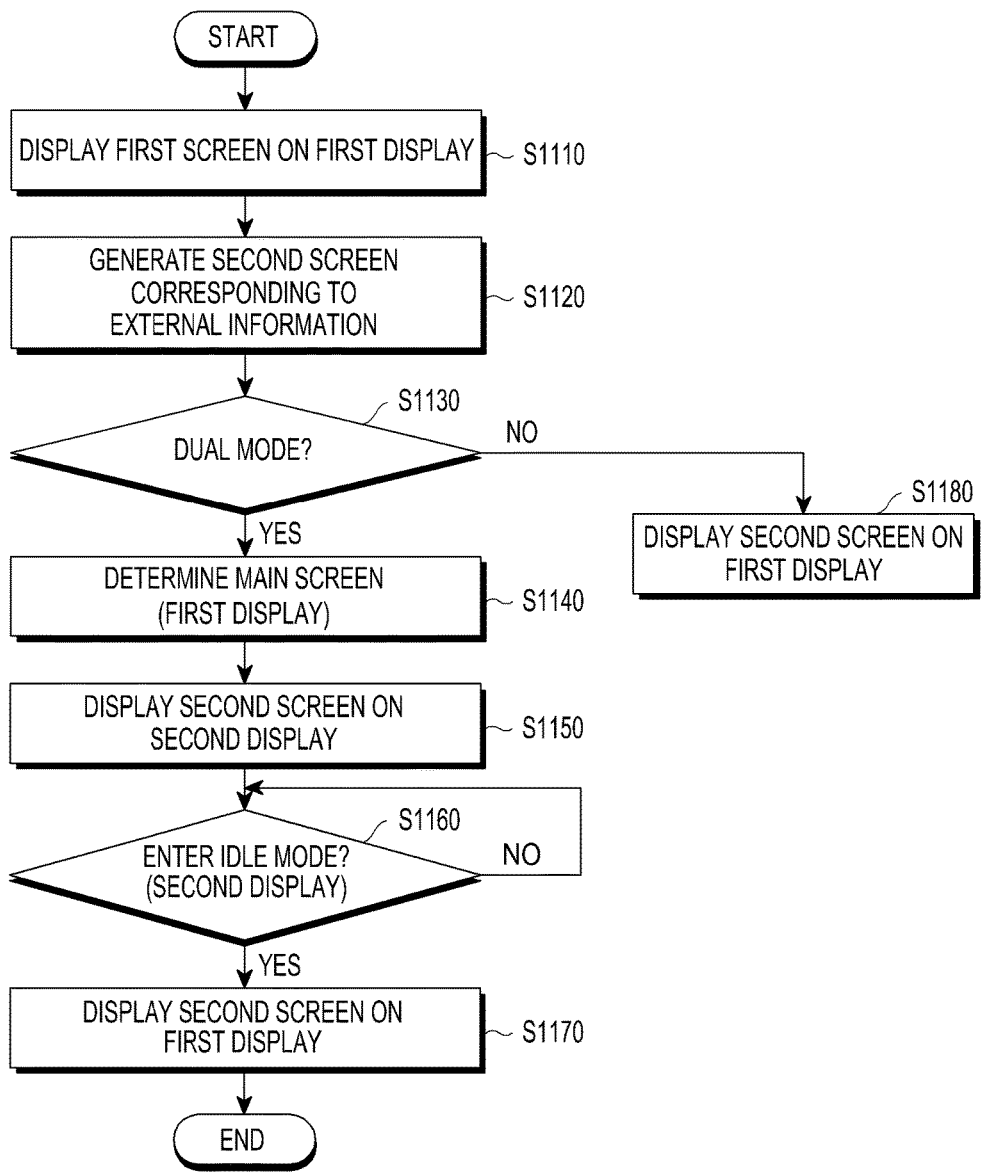
FIG. 11 is a flowchart illustrating a method for controlling a plurality of displays according to another embodiment of the present disclosure.
Figure 12A:
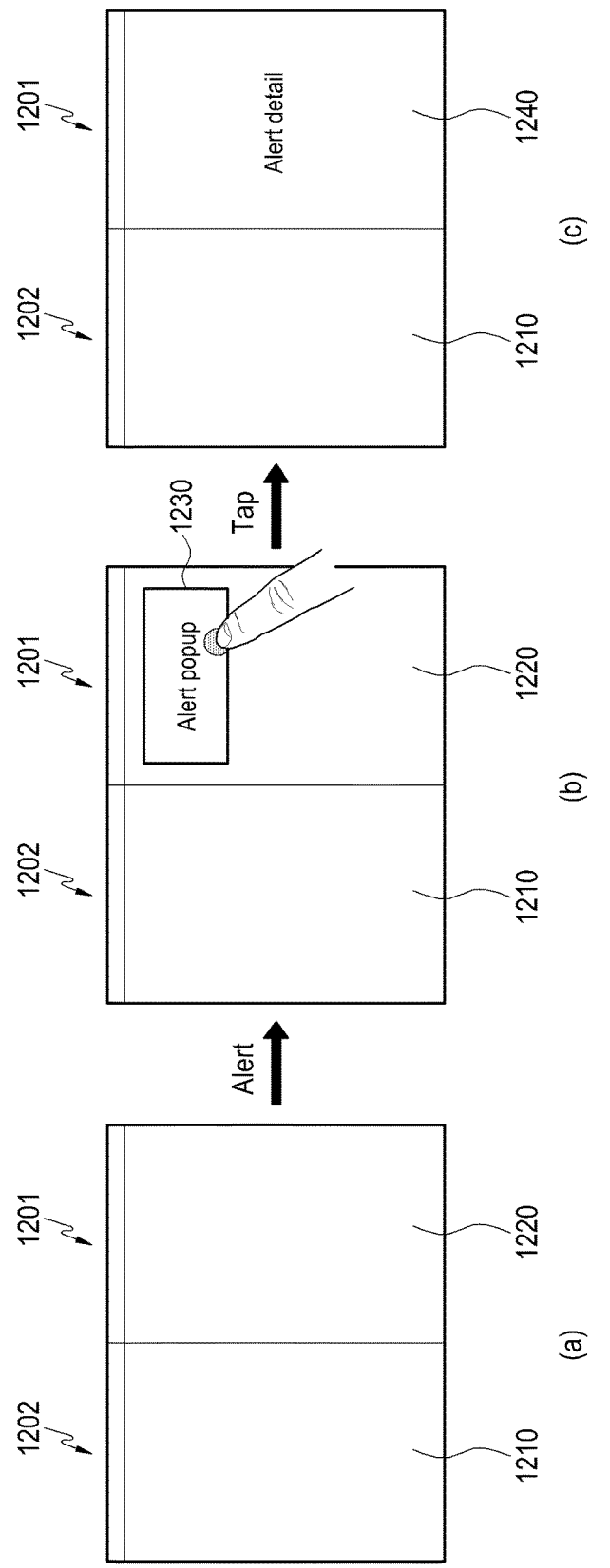
FIGS. 12A and 12B show an example of a method for controlling a plurality of displays according to another embodiment of the present disclosure.
Figure 12B:
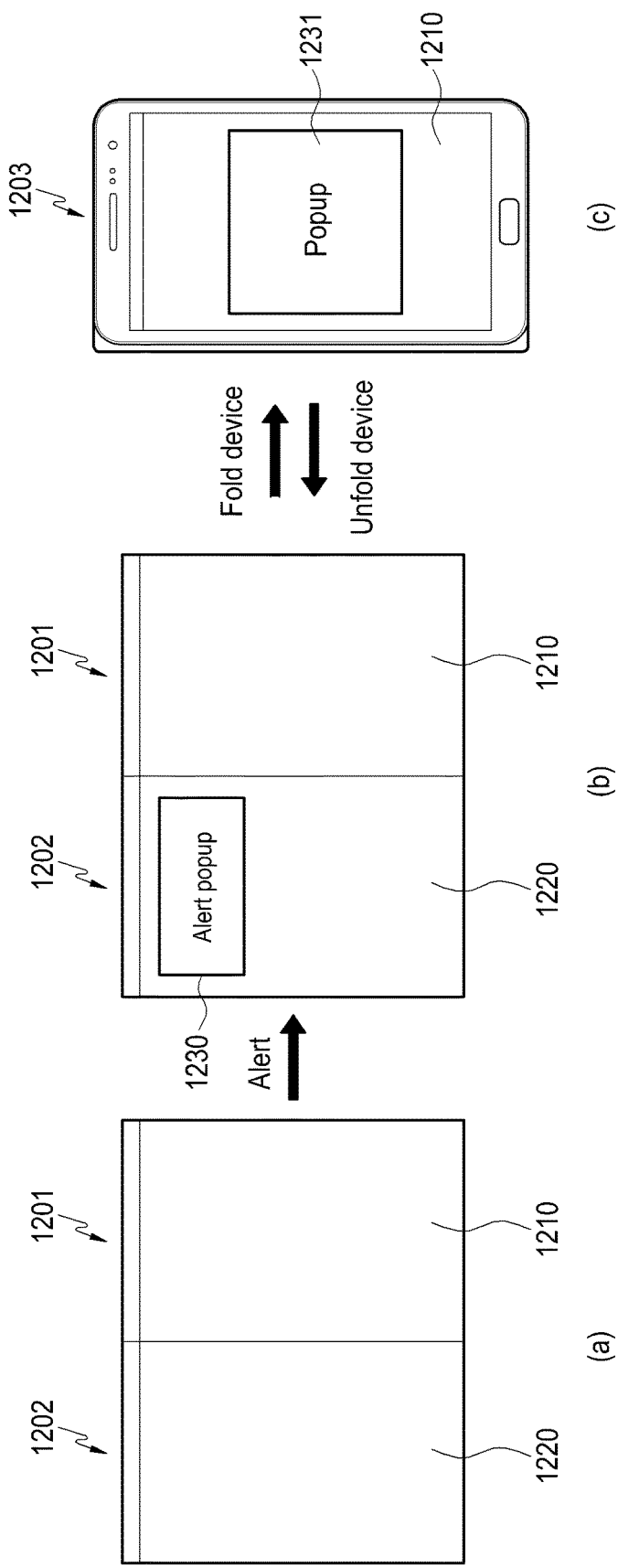
Figure 13A:
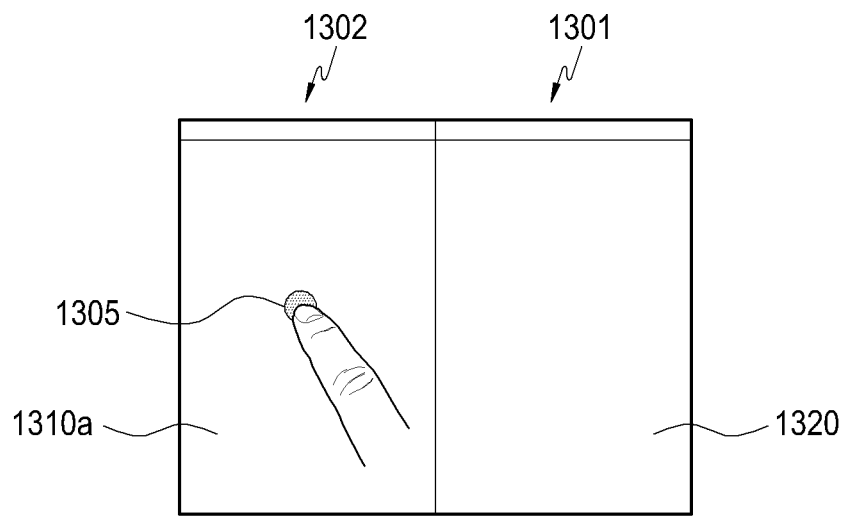
FIGS. 13A and 13B shows an example of a method for controlling a plurality of displays according to another embodiment of the present disclosure.
Figure 13B:
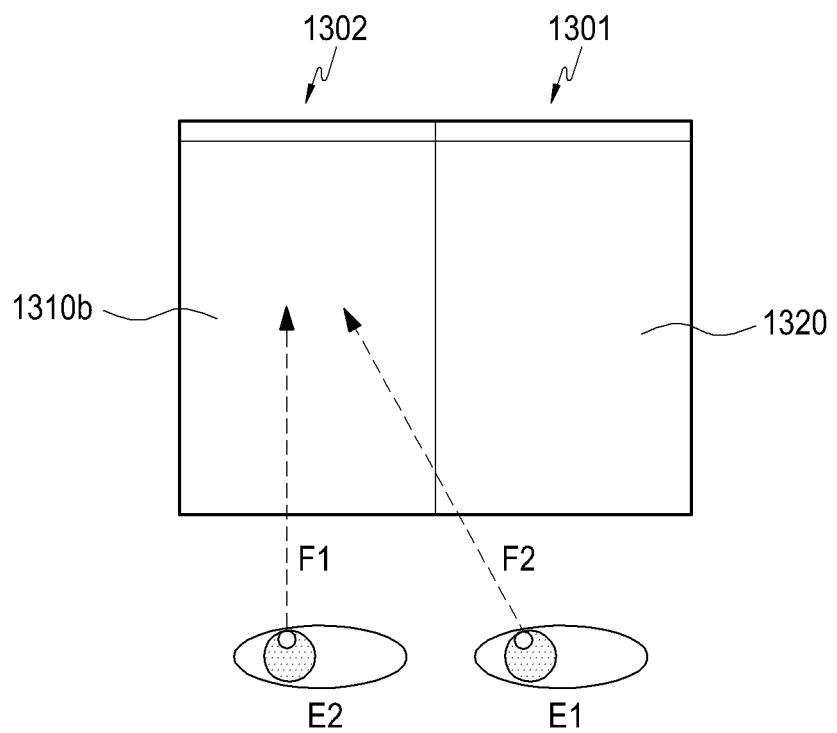

FIG. 11 is a flowchart illustrating a method for controlling a plurality of displays according to another embodiment of the present disclosure, FIGS. 12A and 12B show an example of a method for controlling a plurality of displays according to another embodiment of the present disclosure, FIGS. 13A and 13B show an example of a method for controlling a plurality of displays according to another embodiment of the present disclosure, and FIGS. 14A, 14B, 14C, 14D, 14E, and 14F show an example of a method for controlling a plurality of displays according to another embodiment of the present disclosure.

Referring to FIG. 11, a method for controlling a plurality of displays according to another embodiment of the present disclosure will be described.

Referring to FIG. 11, the screen controller 180 displays a first screen on the first display 501 in a state where the first display 501 is activated in operation S1110, and generates a second screen, which is a notification screen generated corresponding to information received from an external source in operation S1120.

The screen controller 180 determines whether a mode is a dual display mode where the second display 502 is activated in operation S1130, and if so, the screen controller 180 determines which one (of the first display 501 and the second display 502?) displays a main screen that is currently used by the user in operation S1140; if the first display 501 displays the main screen, the screen controller 180 displays the second screen on the second display 502 in operation S1150. If the mode is the single display mode where the second display 502 is deactivated, the screen controller 180 displays the second screen on the first display 501 in operation S1180.

Then, in operation S1160, the screen controller 180 controls the second display 502 to enter the idle mode in a state where the first display 501 and the second display 501 are activated. The display entering the idle mode may be the first display 501, and in this case, subsequent processes may be inverse to the following processes.

Once the second display 501 enters the idle mode, the screen controller 180 displays the second screen displayed on the second display 502 entering the idle mode on the first display 501 that does not enter the idle mode in operation S1170.

Referring to FIGS. 12A, 12B, 13A, 13B, 14A, 14B, 14C, 14D, 14E, and 14F, a description will be made of an operation process of a plurality of displays according to another embodiment of the present disclosure.

As shown in (a) of FIG. 12A, in a state where a first display 1201 and a second display 1202 are activated, a main screen 1210 currently used by the user is displayed on the second display 1202, and a sub screen 1220 is displayed on the first display 1201, if displaying of notification information (or alert information) generated corresponding to information received from an external source is requested, then a pop-up 1230 indicating the notification information is displayed on the first display 1201 where the sub screen 1220 is displayed as shown in (b) of FIG. 12A. If the user taps the pop-up 1230, detailed information 1240 of the notification information is displayed on the first display 1201 as shown in (c) of FIG. 12A.

As shown in (a) of FIG. 12B, in a state where the main screen 1210 is displayed on the first display 1201 and the sub screen 1220 is displayed on the second display 1202, if displaying of notification information generated corresponding to information received from an external source is requested, then the pop-up 1230 indicating the notification information is displayed on the second display 1202 where the sub screen 1220 is displayed as shown in (b) of FIG. 12B. In this state, if the second display 1202 enters the idle mode, a pop-up 1231 for the notification information may be moved to and displayed on a display 1203 switched to the single display mode as shown in (c) of FIG. 12B.

In a state where a first display 1301 and a second display 1302 are activated, determining a main screen currently used by the user and a sub screen may be performed by determining out of the first display 1301 and the second display 1302, as the main screen, the second display 1302 corresponding to a screen 1310a selected last by a user's touch 1305 as shown in (a) of FIGS. 13A and 13B or by detecting gaze directions F1 and F2 of eyes E1 and E2 of the user and determining out of the first display 1301 and the second display 1302, as the main screen, the second display 1302 corresponding to a gaze screen 1310b to which the gaze directions F1 and F2 are directed from the user's eyes E1 and E2 as shown in (b) of FIGS. 13A and 13B.

Figure 14A:
FIGS. 14A, 14B, 14C, 14D, 14E, and 14F shows an example of a method for controlling a plurality of displays according to another embodiment of the present disclosure.
Figure 14B:
Figure 14C:
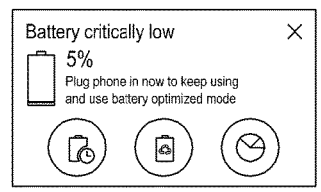
Figure 14D:
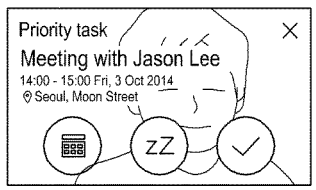
Figure 14E:
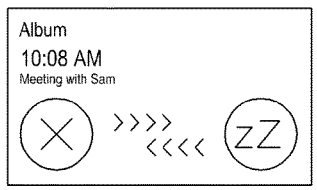
Figure 14F:
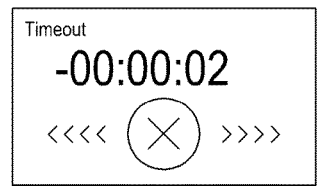

Herein, the popup 1230 indicating the notification information may indicate, for example, reception of a call in a form shown in FIG. 14A, reception of a message in a form shown in FIG. 14B, a charging state of a battery in a form shown in FIG. 14C, event notification of a planner in a form shown in FIG. 14D, a time alarm in a form shown in FIG. 14E, and a timer alarm in a form shown in FIG. 14F.

Figure 15:
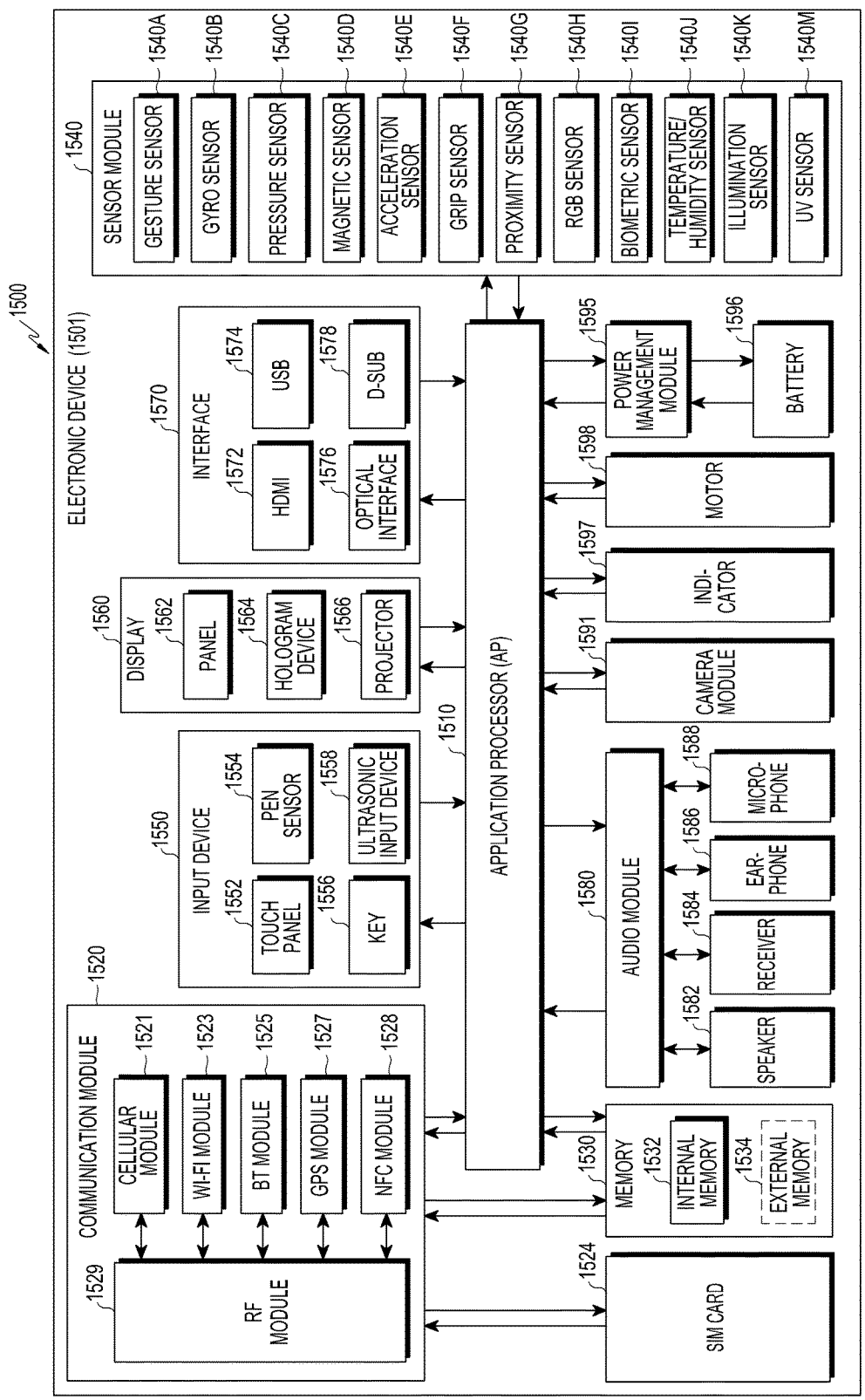
FIG. 15 is a block diagram of an electronic device according to various embodiments of the present disclosure.

FIG. 15 is a block diagram of an electronic device 1500 according to various embodiments of the present disclosure.

The electronic device may form the entire electronic device 101 illustrated in FIG. 1 or a part thereof. Referring to FIG. 15, the electronic device 1501 may include one or more APs 1510, a communication module 1520, a subscriber identification module (SIM) card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The AP 1510 (e.g., the processor 120) controls multiple hardware or software components connected to the AP 1510 by driving an OS or an application program, and performs processing and operations with respect to various data including multimedia data. The AP 1510 may be implemented with, for example, a system on chip (SoC). According to an embodiment, the server 1510 may further include a graphic processing unit (GPU, not shown).

The communication module 1520 (e.g., the communication interface 170) may perform data transmission/reception in communication between the electronic device 1501 (e.g., the electronic device 101) and other electronic devices (e.g., the electronic device 102 or 104 or the server 106) connected thereto through a network. According to an embodiment, the communication module 1520 may include a cellular module 1521, a WiFi module 1523, a BT module 1525, a GPS module 1527, an NFC module 1528, and a radio frequency (RF) module 1529.

The cellular module 1521 may provide a voice call, a video call, a text message service, or an Internet service through a communication network (e.g., LTE, LTE-A, CDMA, WCDMA, UMTS, WiBro, GSM, etc.). The cellular module 1521 identifies and authenticates the electronic device in a communication network by using, for example, an SIM (e.g., the SIM card 1524). According to an embodiment, the cellular module 1521 performs at least some of functions that may be provided by the AP 1510. For example, the cellular module 1521 may perform at least some of multimedia control functions.

According to an embodiment, the cellular module 1521 may include a communication processor (CP). The cellular module 1521 may be implemented with, for example, a SoC. Although elements such as the cellular module 1521 (e.g., the communication processor), the memory 1530, or the power management module 1595 are illustrated as elements separate from the AP 1510, the AP 1510 may be configured to include at least some (e.g., the cellular module 1521) of the described elements according to an embodiment.

According to an embodiment, the AP 1510 or the cellular module 1521 (e.g., the communication processor) may load instructions or data received from at least one of a non-volatile memory and other elements connected thereto into a volatile memory and process the loaded instructions or data. Furthermore, the AP 1510 or the cellular module 1521 may store data received from or generated by at least one of other elements in a non-volatile memory.

Each of the WiFi module 1523, the BT module 1525, the GPS module 1527, and the NFC module 1528 may include a processor for processing data transmitted and received by a corresponding module. In FIG. 15, the cellular module 1521, the WiFi module 1523, the BT module 1525, the GPS module 1527, and the NFC module 1528 are shown as separate blocks, but at least some (e.g., two or more) of them may be included in one integrated chip (IC) or IC package. For example, at least some (e.g., the communication processor corresponding to the cellular module 1521 and the WiFi processor corresponding to the WiFi module 1523) of the processors corresponding to the cellular module 1521, the WiFi module 1523, the BT module 1525, the GPS module 1527, and the NFC module 1528 may be implemented as one SoC.

The RF module 1529 may transmit/receive data, for example, an RF signal. The RF module 1529 may include a transceiver, a power amp module (PAM), a frequency filter, a low noise amplifier (LNA), or the like, though not shown. Further, the RF module 1529 may further include a part for transmitting/receiving electronic waves over a free air space in wireless communication, for example, a conductor, a conducting wire or the like. In FIG. 15, the cellular module 1521, the WiFi module 1523, the BT module 1525, the GPS module 1527, and the NFC module 1528 are shown as sharing one RF module 1529, but according to an embodiment, at least one of them may transmit and receive an RF signal through a separate RF module.

The SIM card 1524 may be a card including a subscriber identification module and may be inserted into a slot formed on a particular position of the electronic device. The SIM card 1524 may include unique identification information (e.g., an integrated circuit card identifier (ICCID)) or subscriber information (e.g., international mobile subscriber identity (IMSI)).

The memory 1530 (e.g., the memory 130) may include an internal memory 1515 or an external memory 1534. The internal memory 1515 may include, for example, at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, a NAND flash memory, a NOR flash memory, etc.).

According to an embodiment, the external memory 1534 may be a solid state drive (SSD). The external memory 1534 may further include a flash drive, for example, compact flash (CF), secure digital (SD), micro-SD, mini-SD, extreme Digital (xD), a memory stick, etc. The external memory 1534 may be functionally connected with the electronic device 1501 through various interfaces. According to an embodiment, the electronic device 1501 may further include a storage device (or a storage medium) such as a hard drive.

The sensor module 1540 measures physical quantity or senses an operation state of the electronic device 1501 to convert the measured or sensed information into an electric signal. The sensor module 1540 may include, for example, at least one of a gesture sensor 1540A, a gyro sensor 1540B, a pressure sensor 1540C, a magnetic sensor 1540D, an acceleration sensor 1540E, a grip sensor 1540F, a proximity sensor 1540G, a color sensor 1540H (e.g., RGB sensor), a biometric sensor 1540I, a temperature/humidity sensor 1540J, an illumination sensor 1540K, and a ultraviolet (UV) sensor 1540M. Additionally or alternatively, the sensor module 1540 may include, for example, an E-nose sensor, an electromyography (EMG) sensor, an electroencephalogram (EEG) sensor, an electrocardiogram (ECG) sensor, an infrared (IR) sensor (not shown), an iris sensor (not shown), or a fingerprint sensor (not shown). The sensor module 1540 may include at least one sensor capable of sensing or recognizing biometric information such as, a fingerprint, a foot fingerprint, an iris, a face, a heartbeat rate, a brainwave, a joint, pulse, and the like. Also, the sensor module 1540 may include various sensors capable of sensing or recognizing biometric information of a user or information associated with bending of a joint of the user, in addition to the above-described sensors. The sensor module 1540 may further include a control circuit for controlling at least one sensor included therein.

The input device 1550 may include a touch panel 1552, a (digital) pen sensor 1554, a key 1556, or an ultrasonic input device 1558. The touch panel 1552 may sense a touch input using at least one of a capacitive type, a resistive type, an IR type, or an ultrasonic type. The touch panel 1552 may further include a control circuit. In the case of the capacitive type, physical contact or proximity recognition is possible. The touch panel 1552 may further include a tactile layer. In this case, the touch panel 1552 may provide a tactile reaction to a user.

The (digital) pen sensor 1554 may be implemented in a manner that is the same as or similar to reception of a user touch input or using a separate recognition sheet. The key 1556 may also include a physical button, an optical key, or a keypad. The ultrasonic input device 1558 senses sound waves through a microphone (e.g., the microphone 1588) of the electronic device 1501 using an input means that generates an ultrasonic signal, thereby checking data, and is capable of wireless sensing. According to an embodiment of the present disclosure, the electronic device 1501 may also receive a user input from an external device (for example, a computer or a server) connected thereto, using the communication module 1520.

The display 1560 (e.g., the display 160) may include a panel 1562, a hologram device 1564, or a projector 1566. The panel 1562 may be, for example, a liquid crystal display (LCD), an active-matrix organic light emitting diode (AMOLED), or the like. The panel 1562 may be implemented to be flexible, transparent, or wearable. The panel 1562 may be configured with the touch panel 1552 in one module. The hologram device 1564 shows a stereoscopic image in the air by using interference of light. The projector 1566 displays an image through projection of light onto a screen. The screen may be positioned inside or outside the electronic device 1501. According to an embodiment, the display 1560 may further include a control circuit for controlling the panel 1562, the hologram device 1564, or the projector 1566.

According to an embodiment, the interface 1570 may include an HDMI 1572, a USB 1574, an optical communication 1576, or a D-subminiature (D-sub) 1578. The interface 1570 may be included in the communication interface 170 illustrated in FIG. 1. Additionally or alternatively, the interface 1570 may include, for example, an MHL interface, an SD card/MMC interface, or an infrared data association (IrDA) interface.

The audio module 1580 bi-directionally converts sound and an electric signal. At least some element of the audio module 1580 may be included in the I/O interface 150 illustrated in FIG. 1. The audio module 1580 processes sound information input or output through the speaker 1582, the receiver 1584, the earphone 1586, or the microphone 1588.

The camera module 1591 is a device capable of capturing a still image or a moving image, and according to an embodiment, may include one or more image sensors (e.g., a front sensor or a rear sensor), a lens (not shown), an image signal processor (ISP), or a flash (e.g., an LED, a xenon lamp, etc.).

The power management module 1595 manages power of the electronic device 1501. Although not shown, the power management module 1595 may include, for example, a power management integrated circuit (PMIC), a charger IC, or a battery or fuel gauge.

The PMIC may be mounted, for example, in ICs or SoC semiconductors. The charging methods may be classified into wired charging and wireless charging. The charger IC may charge a battery and prevent inflow of excessive voltage or excessive current from a charger. According to an embodiment of the present disclosure, the charger IC may include a charger IC for at least one of the wired charging method and the wireless charging method. Examples of the wireless charging may include magnetic resonance charging, magnetic induction charging, and electromagnetic charging, and an additional circuit such as a coil loop, a resonance circuit, a rectifier or the like may be added for the wireless charging.

The battery gauge measures the remaining capacity of the battery 1596 or the voltage, current, or temperature of the battery 1596 during charging. The battery 1596 may store or generate electricity and supply power to the electronic device 1501 using the stored or generated electricity. The battery 1596 may include a rechargeable battery or a solar battery.

The indicator 1597 displays a particular state, for example, a booting state, a message state, or a charging state, of the electronic device 1501 or a part thereof (e.g., the AP 1510). The motor 1598 converts an electric signal into mechanical vibration. Although not shown, the electronic device 1501 may include a processing device (e.g., a GPU) for supporting a mobile TV. The processing device for supporting the mobile TV processes media data according to, a standard such as digital multimedia broadcasting (DMB), digital video broadcasting (DVB), or mediaFlo™.

Each of the foregoing elements of the electronic device according to the present disclosure may be configured with one or more components, names of which may vary with a type of the electronic device. The electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

The embodiments disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

What is claimed is:

1. An electronic device for controlling a plurality of displays, the electronic device comprising:

a first display configured to display a first screen;

a second display configured to display a second screen; and at least one processor configured to:
- identify attributes of the first screen and the second screen according to whether the first screen and the second screen have a correlation therebetween,
- identify whether to display, on one of the first display and the second display that does not enter an idle mode, a screen displayed on the other display that enters the idle mode in correspondence to entry of the other of the first display and the second display to the idle mode based on the identified attributes of the first screen and the second screen, and
- control the first screen or the second screen to be displayed on the first display or the second display, wherein identifying of the attributes of the first screen and the second screen comprises:
- identifying that the first screen and the second screen have the correlation when the first screen is an execution screen corresponding to a first application and the second screen is a screen generated according to an input to the first application, and
- identifying that the first screen and the second screen do not have the correlation when the second screen is a screen generated according to information received from an external source.

2. The electronic device of claim 1, wherein the at least one processor is further configured to identify which one of the first screen and the second screen is a main screen currently used by a user according to the correlation between the first screen and the second screen.

3. The electronic device of claim 2, wherein the at least one processor is further configured to identify, as the main screen, one of the first screen and the second screen on which the first application calling the second application displayed on the other screen is displayed.

4. The electronic device of claim 2, wherein the at least one processor is further configured to identify, as the main screen, one of the first screen and the second screen which is a selected screen selected last by the user or a gaze screen to which a gaze of the user is directed.

5. The electronic device of claim 4, wherein the at least one processor is further configured to:
- when the first screen and the second screen do not have the correlation, identify whether to display a screen displayed on a display that enters the idle mode on a display that does not enter the idle mode according to which one of the first screen and the second screen is the main screen in correspondence to the entry to the idle mode, and
- control the first screen or the second screen to be displayed on the first display or the second display.

6. The electronic device of claim 1, wherein the at least one processor is further configured to identify, when the first screen and the second screen have a correlation therebetween, detailed attributes of the correlation between the first screen and the second screen according to whether a second application of the second screen generated corresponding to an input to the first application of the first screen is data-linked to the first application.

7. The electronic device of claim 6, wherein the at least one processor is further configured to:
- identify whether to display a screen displayed on a display that enters the idle mode on a display that does not enter the idle mode according to detailed attributes of the correlation between the first screen and the second screen in correspondence to entry into the idle mode, when the first screen and the second screen have the correlation, and
- control the first screen or the second screen to be displayed on the first display or the second display.

8. The electronic device of claim 1, further comprising:
- a main body portion comprising the first display;
- a cover portion comprising the second display; and
- a connection portion configured to connect the main body portion with the cover portion such that the main body portion and the cover portion are folded or unfolded with respect to each other in a range of 360 degrees, wherein the at least one processor is further configured to:
- identify a relative angle between the first display of the main body portion and the second display of the cover portion, and
- identify which one of the first display and the second display is to enter the idle mode.

9. A method of an electronic device to control a plurality of displays, the method comprising:
- displaying a first screen on a first display;
- displaying a second screen on a second display;
- identifying attributes of the first screen and the second screen according to whether the first screen and the second screen have a correlation therebetween;
- controlling entry of one of the first display and the second display into an idle mode;
- identifying whether to display a screen displayed on a display that enters the idle mode on a display that does not enter the idle mode based on the identified attributes of the first screen and the second screen; and
- displaying the first screen or the second screen on the first display or the second display according to a result of the determination, wherein identifying of the attributes of the first screen and the second screen comprises:
- identifying that the first screen and the second screen have the correlation when the first screen is an execution screen according to a first application and the second screen is a screen generated corresponding to an input to the first application, and
- identifying that the first screen and the second screen do not have the correlation when the second screen is a screen generated according to information received from an external source.

10. The method of claim 9, wherein the identifying of the attributes of the first screen and the second screen comprises identifying which one of the first screen and the second screen is a main screen currently used by a user according to the correlation between the first screen and the second screen.

11. The method of claim 10, wherein the identifying of which one of the first screen and the second screen is the main screen comprises identifying, as the main screen, one of the first screen and the second screen on which the first application calling the second application displayed on the other screen is displayed.

12. The method of claim 10, wherein the identifying of which one of the first screen and the second screen is the main screen comprises identifying, as the main screen, one of the first screen and the second screen which is a selected screen selected last by the user or a gaze screen to which a gaze of the user is directed.

13. The method of claim 12, wherein the controlling of the first screen or the second screen to be displayed on the first display or the second display in correspondence to the entry to the idle mode comprises:

identifying, when the first screen and the second screen do not have the correlation, whether to display a screen displayed on a display that enters the idle mode on a display that does not enter the idle mode according to which one of the first screen and the second screen is the main screen in correspondence to the entry to the idle mode; and controlling the first screen or the second screen to be displayed on the first display or the second display according to a result of the identification.

14. The method of claim 9, wherein the identifying of the attributes of the first screen and the second screen comprises identifying, when the first screen and the second screen have the correlation, detailed attributes of the correlation between the first screen and the second screen according to whether a second application of the second screen generated corresponding to an input to the first application of the first screen is data-linked to the first application.

15. The method of claim 14, wherein the controlling of the first screen or the second screen to be displayed on the first display or the second display in correspondence to the entry to the idle mode comprises:

when the first screen and the second screen have the correlation, identifying whether to display a screen displayed on a display that enters the idle mode on a display that does not enter the idle mode according to detailed attributes of a correlation between the first screen and the second screen in correspondence to entry into the idle mode; and controlling the first screen or the second screen to be displayed on the first display or the second display according to a result of the identification.

16. The method of claim 9, wherein the electronic device further comprises:
a main body portion comprising the first display,
a cover portion comprising the second display, and
a connection portion configured to connect the main body portion with the cover portion such that the main body portion and the cover portion are folded or unfolded with respect to each other in a range of 360 degrees, and wherein the controlling of the entry to the idle mode comprises:
identifying a relative angle between the first display of the main body portion and the second display of the cover portion, and
identifying which one of the first display and the second display is to enter the idle mode.

* * * * *